(12) United States Patent
De Jager et al.

(10) Patent No.: US 11,170,907 B2
(45) Date of Patent: Nov. 9, 2021

(54) RADIOISOTOPE PRODUCTION

(71) Applicant: ASML Netherlands B.V., Veldhoven (NL)

(72) Inventors: Pieter Willem Herman De Jager, Middelbeers (NL); Sipke Jacob Bijlsma, Veldhoven (NL); Olav Waldemar Vladimir Frijns, Rosmalen (NL); Andrey Alexandrovich Nikipelov, Eindhoven (NL); Nicolaas Ten Kate, Almkerk (NL); Antonius Theodorus Anna Maria Derksen, Elst (NL); Jacobus Johannus Leonardus Hendricus Verspay, Thorn (NL); Robert Gabriël Maria Lansbergen, Schiedam (NL); Aukje Arianne Annette Kastelijn, Schiedam (NL)

(73) Assignee: ASML Netherlands B.V., Veldhoven (NL)

( * ) Notice: Subject to any disclaimer, the term of this patent is extended or adjusted under 35 U.S.C. 154(b) by 600 days.

(21) Appl. No.: 15/770,688

(22) PCT Filed: Nov. 3, 2016

(86) PCT No.: PCT/EP2016/076534
§ 371 (c)(1),
(2) Date: Apr. 24, 2018

(87) PCT Pub. No.: WO2017/076961
PCT Pub. Date: May 11, 2017

(65) Prior Publication Data
US 2019/0066859 A1    Feb. 28, 2019

(30) Foreign Application Priority Data
Nov. 6, 2015    (EP) .................................. 15193337

(51) Int. Cl.
G21G 1/10    (2006.01)
G21G 1/12    (2006.01)
(Continued)

(52) U.S. Cl.
CPC ................. G21G 1/10 (2013.01); G21G 1/12 (2013.01); *G02B 27/10* (2013.01);
(Continued)

(58) Field of Classification Search
CPC .......... H05H 2007/084; H05H 2242/10; H01S 3/0903; G02B 27/10; G21G 1/00; G21G 1/10; G21G 1/12
See application file for complete search history.

(56) References Cited

U.S. PATENT DOCUMENTS 2,741,704 A * 4/1956 Trump .................... G21K 1/08
250/492.3
4,058,486 A * 11/1977 Mallozzi .................. H01S 4/00
372/5
(Continued)

FOREIGN PATENT DOCUMENTS

CN    103745760 A    4/2014
JP    2015-099117 A    5/2015
(Continued)

OTHER PUBLICATIONS

International Search Report and Written Opinion of the International Searching Authority directed to related International Patent Application No. PCT/EP2016/076534, dated Mar. 20, 2017; 34 pages.
(Continued)

*Primary Examiner* — Lily C Garner
(74) *Attorney, Agent, or Firm* — Sterne, Kessler, Goldstein & Fox P.L.L.C

(57) ABSTRACT

A radioisotope production apparatus (RI) comprising an electron source arranged to provide an electron beam (E).
(Continued)

The electron source comprises an electron injector (10) and an electron accelerator (20). The radioisotope production apparatus (RI) further comprises a target support structure configured to hold a target (30) and a beam splitter (40) arranged to direct the a first portion of the electron beam along a first path towards a first side of the target (30) and to direct a second portion of the electron beam along a second path towards a second side of the target (30).

9 Claims, 22 Drawing Sheets

(51) Int. Cl.
| | |
|---|---|
| H05H 7/08 | (2006.01) |
| H01S 3/09 | (2006.01) |
| G02B 27/10 | (2006.01) |
| G21K 5/00 | (2006.01) |
| G21K 5/04 | (2006.01) |
| G21K 1/08 | (2006.01) |
| G21K 1/093 | (2006.01) |
| G21G 1/00 | (2006.01) |

(52) U.S. Cl.
CPC ....... *G21G 2001/0042* (2013.01); *G21K 1/08* (2013.01); *G21K 1/093* (2013.01); *G21K 5/00* (2013.01); *G21K 5/04* (2013.01); *G21K 2201/065* (2013.01); *H01S 3/0903* (2013.01); *H05H 2007/084* (2013.01); *H05H 2242/10* (2013.01)

(56) References Cited

U.S. PATENT DOCUMENTS

| | | | | |
|---|---|---|---|---|
| 4,073,572 A * | 2/1978 | Avicola | ............... | B01D 59/34 |
| | | | | 359/583 |
| 4,084,908 A * | 4/1978 | Johnson | ............... | H01S 3/0057 |
| | | | | 359/281 |
| 4,295,048 A * | 10/1981 | Cleland | ............... | G21K 5/00 |
| | | | | 250/398 |
| 4,582,667 A | 4/1986 | Bauer | | |
| 5,659,223 A | 8/1997 | Goodman | | |
| 5,847,401 A * | 12/1998 | McKeown | ............... | G21K 5/04 |
| | | | | 250/396 ML |
| 6,208,704 B1 | 3/2001 | Lidsky et al. | | |
| 6,444,990 B1 * | 9/2002 | Morgan | ............... | G21G 1/10 |
| | | | | 250/396 R |
| 6,565,633 B1 | 5/2003 | Nakasuji | | |
| 6,844,557 B2 * | 1/2005 | Miller | ............... | G21K 5/10 |
| | | | | 250/396 ML |
| 7,760,854 B2 * | 7/2010 | Kang | ............... | B27K 5/0045 |
| | | | | 378/64 |
| 8,089,025 B2 * | 1/2012 | Sanders | ............... | H05H 1/34 |
| | | | | 219/121.49 |
| 8,090,072 B2 * | 1/2012 | Rubbia | ............... | G21G 1/06 |
| | | | | 376/158 |
| 9,659,736 B2 * | 5/2017 | Rosenthal | ............... | H01J 37/08 |
| 9,728,931 B2 * | 8/2017 | Nikipelov | ............... | H05H 7/08 |
| 9,892,808 B2 * | 2/2018 | Diamond | ............... | G21K 5/08 |
| 10,535,441 B1 * | 1/2020 | Brown | ............... | A61N 5/1043 |
| 10,580,545 B2 * | 3/2020 | Banine | ............... | G02B 5/1823 |
| 10,714,225 B2 * | 7/2020 | Ylimaki | ............... | H05H 9/041 |
| 2002/0106046 A1 * | 8/2002 | Fujimoto | ............... | G21G 1/12 |
| | | | | 376/156 |
| 2002/0141533 A1 * | 10/2002 | Kitaoka | ............... | G03F 7/70991 |
| | | | | 378/34 |
| 2002/0169351 A1 * | 11/2002 | Brown | ............... | G21G 1/12 |
| | | | | 588/1 |
| 2006/0225656 A1 * | 10/2006 | Horiguchi | ............... | H01J 37/32192 |
| | | | | 118/723 MW |
| 2008/0253517 A1 | 10/2008 | Kang et al. | | |
| 2010/0149548 A1 * | 6/2010 | Shmarev | ............... | G01B 9/02022 |
| | | | | 356/517 |
| 2012/0025105 A1 * | 2/2012 | Brown | ............... | G21G 1/12 |
| | | | | 250/492.3 |
| 2012/0281799 A1 * | 11/2012 | Wells | ............... | G21G 1/12 |
| | | | | 376/157 |
| 2013/0083880 A1 * | 4/2013 | Noonan | ............... | H05H 7/02 |
| | | | | 376/190 |
| 2015/0179290 A1 | 6/2015 | Clayton | | |
| 2015/0228438 A1 * | 8/2015 | Rosenthal | ............... | H05H 1/02 |
| | | | | 376/112 |
| 2017/0251547 A1 * | 8/2017 | Ito | ............... | G21G 1/04 |

FOREIGN PATENT DOCUMENTS

| | | | | |
|---|---|---|---|---|
| TW | 2015-24053 A | 6/2015 | | |
| WO | WO-9636391 A2 * | 11/1996 | ............... | A61N 5/10 |
| WO | WO 98/19740 A1 | 5/1998 | | |
| WO | WO 2015/067467 A1 | 5/2015 | | |
| WO | WO 2015/082295 A1 | 6/2015 | | |
| WO | WO-2015044182 A3 * | 9/2015 | ............... | G02B 5/1823 |
| WO | WO 2016/139008 A1 | 9/2016 | | |
| WO | WO-2016139008 A1 * | 9/2016 | ............... | H05H 9/00 |
| WO | WO-2020074209 A1 * | 4/2020 | ............... | G21G 1/12 |

OTHER PUBLICATIONS

International Preliminary Report on Patentability directed to related International Patent Application No. PCT/EP2016/076534, dated May 8, 2018; 26 pages.

Uvarov et al., "Electron Accelerator's Production of Technetium-99m for Nuclear Medicine," IEEE, Proceedings of the 1997 Particle Accelerator Conference, May 1997; pp. 3840-3841.

\* cited by examiner

Step A

Step B

RADIOISOTOPE PRODUCTION

CROSS-REFERENCE TO RELATED APPLICATIONS

This application claims priority of EP 15193337.1 which was filed on Nov. 6, 2015 and which is incorporated herein in its entirety by reference.

FIELD

The present invention relates to radioisotope production apparatus and associated methods. The present invention may be used in a system comprising a free electron laser and a radioisotope production apparatus.

BACKGROUND

Radioisotopes are isotopes which are not stable. A radioisotope will decay after a period of time by emitting a proton and/or neutron. Radioisotopes are used for medical diagnostics and for medical treatments, and are also used in industrial applications.

The most commonly used medical radioisotope is Tc-99m (Technetium), which is used in diagnostic applications. Production of Tc-99m uses a high flux nuclear reactor. Highly enriched uranium, comprising a mixture of U-238 and U-235 is bombarded with neutrons in the nuclear reactor. This causes some of the U-235 to undergo fission and to separate into Mo-99+Sn(×13)+neutrons. The Mo-99 is separated out from the other fission products and shipped to a radiopharmacy. Mo-99 has a half-life of 66 hours and decays to Tc-99m. The Tc-99m has a half-life of only 6 hours (which is useful for medical diagnostic techniques). At the radiopharmacy Tc-99m is separated from the Mo-99 and is then used for medical diagnostic techniques.

Mo-99 is widely used around the world to generate Tc-99m for medical diagnostic techniques. However, there are only a handful of high flux nuclear reactors which can be used to generate Mo-99. Other radioisotopes are also made using these high flux nuclear reactors. All of the high flux nuclear reactors are over 40 years old and cannot be expected to continue to operate indefinitely.

It may be considered desirable to provide an alternative radioisotope production apparatus and associated methods and/or associated systems.

According to an aspect described herein there is provided a radioisotope production apparatus comprising an electron source arranged to provide an electron beam, the electron source comprising an electron injector and an electron accelerator. The radioisotope production apparatus further comprises a target support structure configured to hold a target and a beam splitter. The beam splitter is arranged to direct a first portion of the electron beam along a first path towards a first side of the target and to direct a second portion of the electron beam along a second path towards a second side of the target.

In this way, heat caused by the electron beam is better distributed throughout the target.

The electron beam may comprise a plurality of pulses and the beam splitter may be arranged to direct substantially half of the pulses along the first path and half of the pulses along the second path. In this way, each side of the target will see substantially half of the pulses of the electron beam. The beam splitter may comprise a deflector.

The target may comprise an electron target and a photon target. The electron target may be arranged to receive at least one of the first and second portions of the electron beam and to emit photons towards the photon target.

The electron target may comprise a first part arranged to receive the first portion of the electron beam and a second part arranged to receive the second portion of the electron beam. The first and second parts of the electron target may be disposed either side of the photon target.

The radioisotope production apparatus may further comprise a cooling apparatus arranged to provide a fluid coolant to the target. The cooling apparatus may be arranged to provide a liquid coolant to the electron target and to provide a gas coolant to the photon target. The gas coolant may be provided at a higher pressure than the liquid coolant.

According to a second aspect described herein, there is provided a radioisotope production apparatus comprising an electron source arranged to provide an electron beam, the electron source comprising an electron injector and an electron accelerator. The radioisotope production apparatus further comprises a target support structure configured to hold a target and a first and a second electron beam distribution apparatus, together arranged to scan the electron beam over a surface of the target.

The first beam distribution apparatus may be a first deflector arranged to sweep the electron beam through a predetermined angle towards the second electron beam distribution apparatus.

The second beam distribution apparatus may be a second deflector arranged to deflect the swept electron beam such that it impacts substantially telecentrically on the target. The second distribution apparatus may alternatively be a lens arranged to collimate the electron beam.

The radioisotope production apparatus may further comprise a beam splitter arranged to direct the a first portion of the electron beam along a first path towards a first side of the target and to direct a second portion of the electron beam along a second path towards a second side of the target.

The first and second beam distribution apparatuses may be disposed along the first path.

The radioisotope production apparatus may further comprise third and fourth beam distribution apparatuses together arranged to scan the electron beam over a further surface of the target, the third and fourth beam distribution apparatuses disposed along the second path.

The target may comprise an electron target and a photon target. The electron target may be arranged to receive the electron beam from the second electron beam distribution apparatus and to emit photons towards the photon target. The electron target may comprise a first part arranged to receive the first portion of the electron beam from the first and second distribution apparatuses and a second part arranged to receive the second portion of the electron beam from the third and fourth distribution apparatuses.

According to a third aspect described herein, there is provided a radioisotope production apparatus comprising an electron source arranged to provide an electron beam, the electron source comprising an electron injector and an electron accelerator. The radioisotope production apparatus may further comprise an electron target support structure configured to hold an electron target to receive the electron beam as to generate photons and a photon target support structure configured to hold a photon target for receipt of at least some of the photons.

The radioisotope production apparatus may be configured to induce relative movement between the electron target and the electron beam.

The radioisotope production apparatus may further comprise an electron beam distribution apparatus arranged to move the electron beam relative to the electron target.

The electron beam distribution apparatus may comprise one or more beam deflectors. A beam deflector may be configured to scan the electron beam over the surface of the electron target.

The electron beam distribution apparatus may comprise a lens. A lens may be configured to collimate the electron beam.

The electron target support structure may be configured to move the electron target relative to the electron beam. For example, the electron target support structure may be configured to rotate the electron target.

The electron target may be a liquid and the electron target support structure may be configured to cause the electron target to flow through an electron beam target region.

The radioisotope production apparatus may further comprise a cooling apparatus arranged to provide a fluid coolant to the target. The cooling apparatus may be arranged to provide a liquid coolant to an electron target portion of the target and to provide a gas coolant to a photon target portion of the target. The cooling apparatus may be arranged to provide the gas coolant at a higher pressure than the liquid coolant.

The cooling apparatus may be arranged to provide a Helium coolant at a pressure of approximately 70 bar to the photon target and to provide a water coolant at a pressure of approximately 1 bar to the electron target.

According to a fourth aspect described herein, there is provide a radioisotope production apparatus comprising an electron source arranged to provide an electron beam, the electron source comprising an electron injector and an electron accelerator. The radioisotope production apparatus further comprises a chamber containing a target support structure configured to hold a target in a path of the electron beam and a window through which the electron beam enters the chamber. The window may comprise Silicon Carbide.

In this way, the apparatus provides a window that allows transmission of the electron beam and/or photons, is thermally stable and able to withstand pressure differences between the environment of the electron beam and the chamber.

The window may be dome-shaped. The window may have a curvature of between 85 mm to 4000 mm.

The window may be manufactured by chemical vapour deposition and the chamber may be chamber hermetically sealed.

According to a fifth aspect described herein, there is provided a method of producing a radioisotope having a specific activity within a desired range. The method comprises generating a radioisotope using radioisotope production apparatus. The radioisotope production apparatus comprises an electron source arranged to provide an electron beam, the electron source comprising an electron injector and an electron accelerator and a target support structure configured to hold a target. The method further comprises physically, e.g. mechanically, separating at least one portion of the radioisotope having a specific activity within the desired range.

The method may further comprise perforating the target prior to exposing the target to the electron beam to generate the radioisotope.

The radioisotope production apparatus may be a radioisotope production apparatus according to any of the above described first to fourth aspects.

According to a sixth aspect described herein, there is provided a system comprising a radioisotope production apparatus according to any of the first to fourth aspects and a free electron laser comprising an energy recovery electron accelerator and an undulator. The electron accelerator of the radioisotope production apparatus is positioned to receive an electron beam after it has been accelerated then decelerated by the energy recovery electron accelerator, the electron accelerator of the radioisotope production apparatus being configured to accelerate electrons of the electron beam to an energy of around 14 MeV or more for subsequent delivery to the electron target of the radioisotope production apparatus.

According to a seventh aspect described herein, there is provided a target for use with a radioisotope production apparatus. The target comprises a plurality of spaced portions. The target is configured to expand when the target is subjected to an electron beam such that contact between the plurality of portions is prevented.

The target may be configured to expand such that a gap or space between adjacent portions of the plurality of portions may be maintained.

The target may comprise a plurality of contact points at which adjacent portions of the plurality of portions are in contact. The target may comprise a plurality of openings arranged to extend between at least two contact points of the plurality of contact points.

The target may comprise a flexible or deformable target.

The target may comprise a lattice-type structure or a honeycomb structure.

The plurality of portions may comprise a plurality of target elements. The plurality of target elements may be arranged to form the target. Each target element may comprise a plurality of grooves or through-holes.

The plurality of portions may be concentrically arranged relative to each other.

The plurality of portions may be arranged to form a helical or spiral structure.

According to an eight aspect described herein, there is provided a target for use with a radioisotope production apparatus. The target is configured to expand when the target is subjected to an electron beam such that flow of a coolant through the target is allowed or maintained.

The target may comprise a porous structure or material. For example, the porous structure or material may comprise a foam or sintered material.

According to a ninth aspect described herein, there is provided a target arrangement for use with a radioisotope production apparatus comprising a target and a target support structure. The target support structure is configured to move or rotate the target relative to an electron beam.

The target may be or comprise a target according to the seventh and/or eighth aspects.

The target support structure may be configured to move or rotate the target about a transverse axis or a longitudinal axis of the target.

The target arrangement may comprise a housing. The target arrangement may comprise a window for transmission of the electron beam into the housing.

The target support structure may be arrangeable or arranged in the housing to move or rotate the target relative to the housing and the window.

The window may be arranged to surround the target. The target support structure may be configured to move or rotate the housing and window with the target.

According to a tenth aspect described herein, there is provided a radioisotope production apparatus comprising an electron source arranged to provide an electron beam, the electron source comprising an electron injector and an electron accelerator. The radioisotope production apparatus comprises a target arrangement for arranging a target relative to the electron beam and an electron beam focusing arrangement configured to focus the electron beam on the target.

The target arrangement may comprise a target arrangement according to the ninth aspect.

According to an eleventh aspect described herein, there is provided a target arrangement for use with a radioisotope production apparatus comprising a target. The target comprises a plurality of spaced target elements. The target arrangement comprises a target support structure configured to suspend a part of the plurality of target elements to allow expansion of the part of target elements in at least one direction.

The plurality of target elements may be arranged to be staggered in at least one direction of the target. The plurality of target elements may be arranged to be in line or aligned in at least one other direction of the target.

The target support structure may comprise a plurality of support elements. Each support element may be configured to suspend a portion of the plurality of target elements.

The target support structure may comprise a first portion for suspending the part of the plurality of target elements. The target support structure may comprise a second portion for supporting a free end of another part of the plurality of target elements.

A space between adjacent target elements of the plurality of target elements may be selected to allow for dilation or expansion of the target elements in at least one other direction.

According to a twelfth aspect described herein, there is provided a target for use with a radioisotope production apparatus. The target comprises a first material. The first material comprises a substrate material for conversion into a radioisotope. The target comprises a second material. The second material may be configured to retain converted substrate material.

The second material may be arranged or arrangeable in or with the first material to form the target.

The substrate material may comprise at least one of Dysposion-158 (Dy-158), Radium-226 (Ra-226), Thorium (Th-228) and Nickel-64 (Ni-64).

The second material may comprise a plurality of particles. Each particle may have a size or diameter of about 10 nm.

The second material may comprise at least one of graphene, carbon and metal.

The second material may be suspended or dispersed in a substance or fluid, e.g. a liquid. The second material may comprise a colloid or colloid solution.

According to a thirteenth aspect described herein, there is provided a method of producing a radioisotope. The method comprises arranging a target in a radioisotope production apparatus. The target comprises a first material. The first material comprises a substrate material for conversion into a radioisotope. The target comprises a second material. The second material is configured to retain converted substrate material. The second material is arranged or arrangeable in or with the first material to form the target. The method comprises irradiating the target with an electron beam. The electron beam is configured to cause conversion of a part of the substrate material into the radioisotope. The electron beam is configured to cause displacement of some of the converted substrate material into the second material. The method comprises separating the converted substrate material from the second material.

The step of separating may comprise separating the second material from the first material, prior to separating the converted substrate material from the second material.

According to a fourteenth aspect described herein, there is provided a radioisotope production apparatus comprising an electron source to provide an electron beam, the electron source comprising an injector and an electron accelerator. The radioisotope production apparatus comprises a chamber containing a target support structure configured to hold a target in a path of the electron beam. The radioisotope production apparatus comprises a separation element for separating the chamber from the electron source. The separation element comprises an aperture through which the electron beam enters the chamber.

The radioisotope production apparatus may comprise a shielding element arranged between the separation element and the target support structure. The shielding element may comprise an aperture through which the electron beam passes to the target.

The aperture of the shielding element may be larger than the aperture of the separation element.

The radioisotope production apparatus may comprise a further separation element. The further separation element may comprise a further aperture through which the beam passes towards the target.

The further aperture of the further separation element may of the same size or of a different size than the aperture of the separation element.

The radioisotope production apparatus may comprise a cooling apparatus. The cooling apparatus may be arranged to provide a coolant to the target. The separation element and/or further separation element is arranged in the chamber such that flow of coolant is allowed through the aperture and/or further aperture towards the electron source.

Features of any given aspect of the invention may be combined with features of other aspects of the invention.

Various aspects and features of the invention set out above or below may be combined with various other aspects and features of the invention as will be readily apparent to the skilled person.

BRIEF DESCRIPTION OF THE DRAWINGS

Embodiments of the invention will now be described, by way of example only, with reference to the accompanying schematic drawings, in which.

Generally herein, the same reference numerals within the Figures to refer to the same or equivalent features.

DETAILED DESCRIPTION

Figure 1:
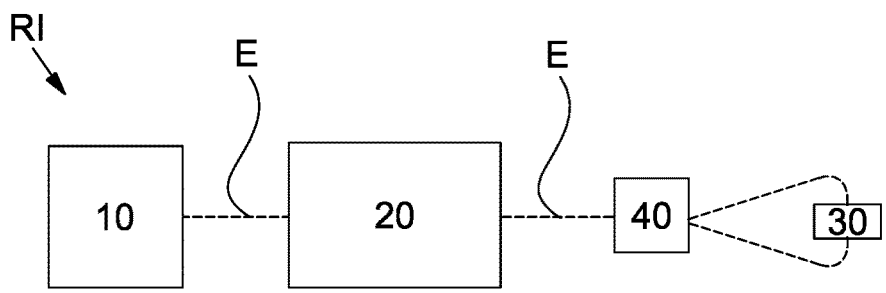
FIG. 1 is a schematic illustration of a radioisotope production apparatuses.

FIG. 1 schematically depicts a radioisotope production apparatus. The radioisotope production apparatus RI comprises an electron injector 10 and an electron accelerator 20 in the form of a linear accelerator. The electron injector 10 is arranged to produce a bunched electron beam and comprises an electron source (for example a photo-cathode which is illuminated by a pulsed laser beam or a thermionic emission source) and a booster which provides an accelerating electric field. The accelerating electric field provided by the booster may for example accelerate the electrons of the electron beam to an energy of around 10 MeV.

Electrons in the electron beam E may be steered to the linear accelerator 20 by magnets (not shown). The linear accelerator 20 accelerates the electron beam E. In an example, the linear accelerator 20 may comprise a plurality of radio frequency cavities which are axially spaced, and one or more radio frequency power sources which are operable to control the electromagnetic fields along the common axis as bunches of electrons pass between them so as to accelerate each bunch of electrons. The cavities may be superconducting radio frequency cavities. Advantageously, this allows: relatively large electromagnetic fields to be applied at high duty cycles; larger beam apertures, resulting in fewer losses due to wakefields; and for the fraction of radio frequency energy that is transmitted to the beam (as opposed to dissipated through the cavity walls) to be increased. Alternatively, the cavities may be conventionally conducting (i.e. not superconducting), and may be formed from, for example, copper. Other types of linear accelerators may be used such as, for example, laser wake-field accelerators or inverse free electron laser accelerators.

Although the linear accelerator 20 is depicted as lying along a single axis in FIG. 1, the linear accelerator may comprise modules which do not lie on a single axis. For example, a bend may be present between some linear accelerator modules and other linear accelerator modules.

The linear accelerator 20 may, for example, accelerate electrons to an energy of around 14 MeV or more. The linear accelerator may accelerate electrons to an energy of around 30 MeV or more (e.g. up to around 45 MeV). It may be beneficial not to accelerate the electrons to an energy greater than a predetermined desired amount (for example, 60 MeV) because at certain energies large quantities of unwanted products other than the desired radioisotope may be generated. In an embodiment, the linear accelerator 130a may accelerate electrons to an energy of around 35 MeV.

The radioisotope production apparatus RI further comprises a target 30 which is configured to receive the electrons and to use the electrons to convert a source material into a radioisotope. The target 30 may be Mo-100 (Mo-100 is a stable and naturally occurring isotope of Mo) which is to be converted into Mo-99 via photon induced neutron emission. The mechanism via which the photons are generated is Bremsstrahlung radiation (in English: braking radiation) generated as a result of the electrons hitting the target 30. The energy of the photons generated in this manner may, for example, be greater than 100 keV, may be greater than 1 MeV, and may be greater than 10 MeV. The photons may be described as very hard X-rays.

This reaction has a threshold energy of 8.29 MeV, and thus will not occur if photons incident upon the photon target have an energy less than 8.29 MeV. The reaction has a cross-section which peaks at around 14 MeV (the reaction cross-section is indicative of the chances of the reaction being induced by a photon with a given energy). In other words, the reaction has a resonance peak at around 14 MeV. Therefore, in an embodiment photons with an energy of around 14 MeV or more may be used to convert a Mo-100 photon target into Mo-99.

The energy of the photons generated has an upper limit which is set by the energy of the electrons in the electron beam E. The photons will have a distribution of energies, but the upper limit of that distribution will not extend beyond the energy of the electrons in the electron beam. Thus, in an embodiment used to convert a Mo-100 photon target into Mo-99 the electron beam will have an energy of at least 8.29 MeV. In an embodiment the electron beam E may have an energy of around 14 MeV or more.

As the energy of the electron beam is increased, more photons with energies sufficient to cause the desired reaction will be generated (for the same current of electrons). For example, as noted above Mo-99 generation has a cross-section which peaks at around 14 MeV. If the electron beam E has an energy of around 28 MeV then each electron may generate two photons with an energy of around 14 MeV, thereby increasing conversion of the photon target to Mo-99. However, as the energy of the electron beam is increased photons with higher energies will induce other unwanted reactions. For example, photon induced emission of a neutron and a proton has a threshold energy of 18 MeV. This reaction is not desired because it does not generate Mo-99 but instead generates an unwanted reaction product.

In general, the selection of the energy of the electron beam (and hence the maximum energy of the photons) may be based on a comparison between the yield of wanted products (e.g. Mo-99) and the yield of unwanted products. In an embodiment, the electron beam may have an energy of around 14 MeV or more. The electron beam E may for example have an energy of around 30 MeV or more (e.g. up to around 45 MeV). This range of electron beam energies may provide good productivity of photons with energies around the reaction resonance peak of 14 MeV. In other embodiments, however, the electron beam may have other energies. For example, the electron beam may have an energy of 60 MeV as electrons at this energy may be capable of causing multiple reactions and thereby increasing the yield.

Figure 2A:
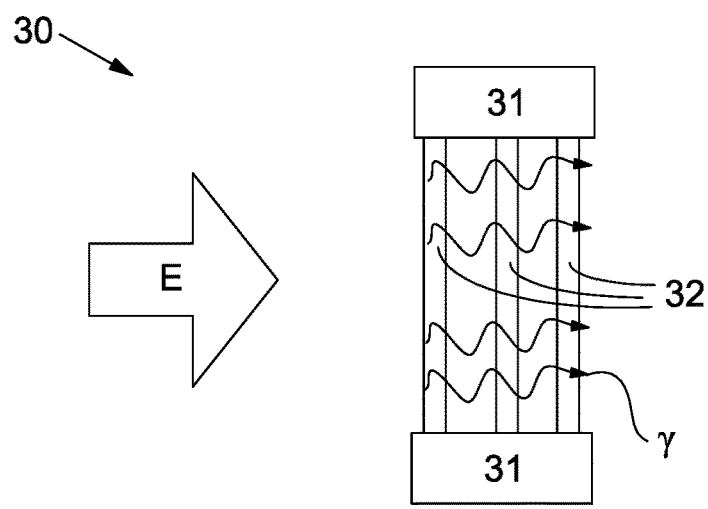
FIG. 2a is a schematic illustration of a target within a radioisotope production apparatus.

FIG. 2a schematically depicts an example arrangement of the target 30. In FIG. 2a, the target 30 comprises a plurality of plates 32 of Mo-100 supported by a support 31. As described above, when electrons in the electron beam E are incident on the plates 32, photons are emitted. The photons emitted from the target 30 are schematically depicted by wavy lines γ in FIG. 2a. When a photon γ is incident upon a Mo-100 nucleus it causes a photonuclear reaction via which a neutron is ejected from the nucleus. The Mo-100 atom is thereby converted to an Mo-99 atom. In the arrangement of FIG. 2a, the plates 32 may be considered to be both an electron target and a photon target.

The target 30 may receive photons γ for a period of time, during which the proportion of Mo-99 in the target 30 increases and the proportion of Mo-100 in the target decreases. The target 30 is then removed from the radioisotope production apparatus RI for processing and transportation to a radiopharmacy. Tc-99, which is the decay product of Mo-99, is extracted and used in medical diagnostic applications.

Figure 2B:
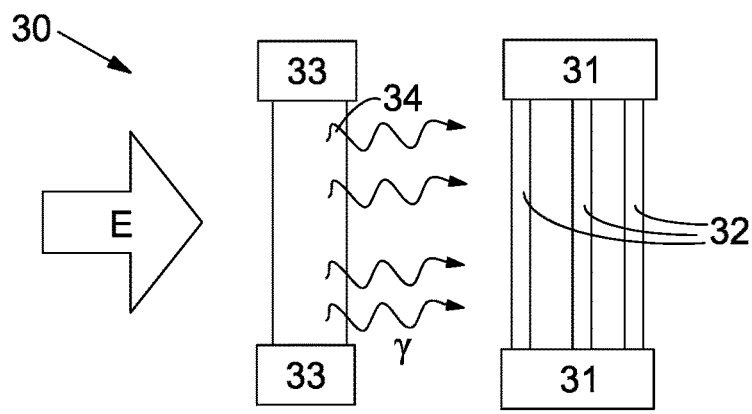
FIG. 2b is a schematic illustration of a target comprising separate electron and photon targets for a radioisotope production apparatus.

FIG. 2b schematically depicts an alternative example arrangement of the target 30. In FIG. 2b, a target 30 further comprises a separate electron target 34. Where a separate electron target is provided, the target plates 32 may be considered to be a photon target. The electron target 34 may, for example, be formed from tungsten, tantalum or some other material which will decelerate the electrons and generate photons. The electron target 34, may, however, be formed from the same material as a photon target (e.g. Mo-100). The electron target is held by a support structure 33.

Although the target 32 shown in FIG. 2 comprises three plates, the target may comprise any suitable number of plates. Although the described target comprises Mo-100, the photon target may comprise any suitable material. Similarly, the material of the target may be provided in any suitable shape and/or configuration. Shielding may be provided around target 30 (e.g. lead shielding).

Although the electron target 34 of FIG. 2b is depicted as a single block of material, it may be provided as a plurality of plates. The plates may for example have a construction which corresponds to the construction of the target plates 32 described above. Similarly, the support structure 33 may be configured to hold a plurality of electron target plates.

The electron target 34 and the target plates 32 may be provided in conduits through which coolant fluid is flowed, as described further below.

Referring again to FIG. 1, the radioisotope production apparatus RI further comprises an electron beam splitter 40. The electron beam splitter is arranged to split the electron beam E along two propagation paths: a first propagation path towards one side of the target 30 and a second propagation path towards an opposite side of the target 30. Magnets (not shown) may be provided to steer the electron beam E along each of the propagation path. As will be understood by those skilled in the art, the electron beam E is what may be referred to as a pulse train. The electron beam splitter 40 is arranged to direct a portion of the pulses along the first path and a portion of the pulses along the second path. For example, 50% of the pulses in the electron beam E may be sent along the first path, and 50% of the pulses sent along the second path. It will be appreciated, however, that any ratio of pulses (between the two propagation paths) may be used.

The electron beam splitter 40 may be implemented using any appropriate means and may be, for example a deflector (e.g. a kicker) utilizing magnetic or electrostatic deflection. The splitting may be done at a sufficiently high frequency that the thermal load is distributed substantially evenly on each side of the target 30. In some embodiments, pulses may be skipped within the electron beam E to allow time for switching between pulses. By way of example, if pulses are generated at 650 MHz, then 1000 pulses may be skipped every 10 milliseconds, leaving approximately 1.5 microseconds for the beam splitter 40 to switch the propagation path of the electron beam E.

Figure 3A:
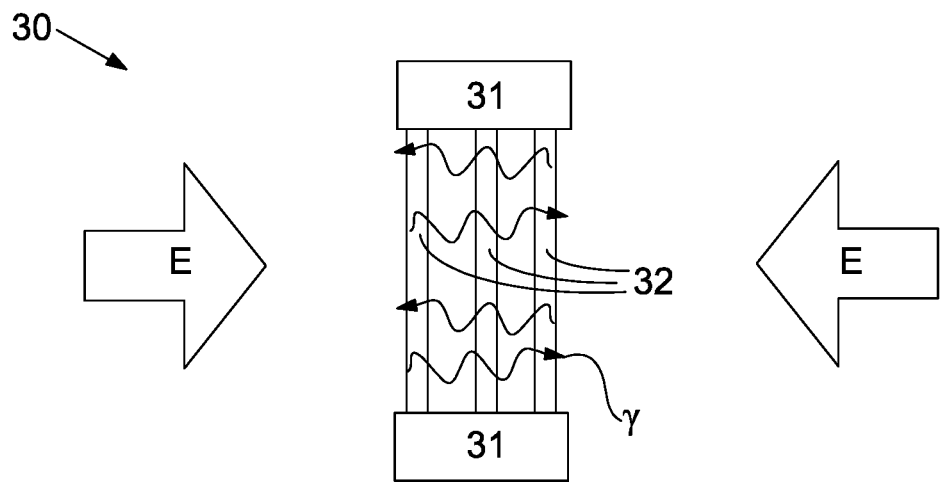
FIG. 3a is a schematic illustration of a target receiving radiation from two sides.
Figure 3B:
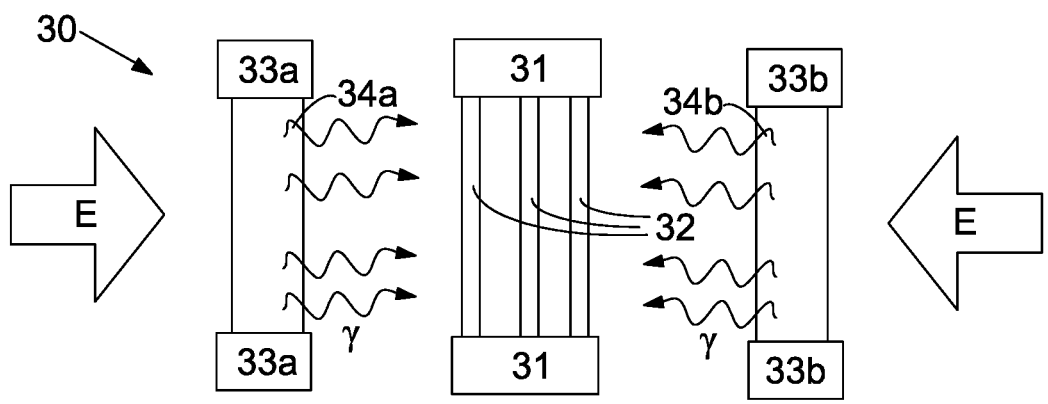
FIG. 3b is a schematic illustration of a target including separate electron and photon targets receiving radiation from two sides.

FIG. 3a schematically illustrates the electron beam E received at each side of the target 30. FIG. 3b schematically illustrates an arrangement of the target 30 where separate electron targets are provided. In FIG. 3b, the target 30 comprises two electron targets 34a, 34b disposed at respective sides of the target plates 32 and supported by respective support structures 33a, 33b. Each electron target 34a, 34b is arranged to receive a portion of the electron beam E and to emit photons towards either side of the target plates 32.

By distributing the headload more uniformly across the target 30, the total temperature generated at the target should be lower, thereby easing and simplifying cooling requirements.

Figure 4:
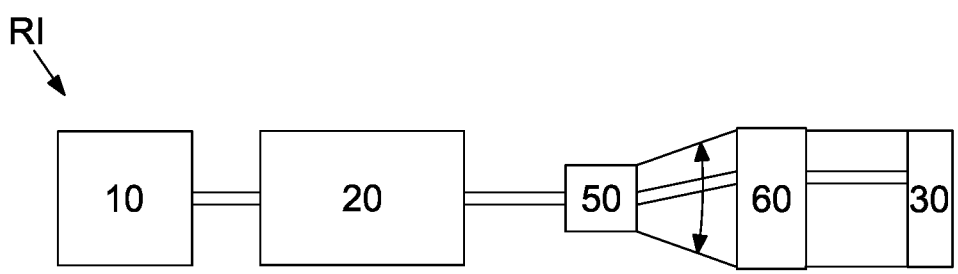
FIG. 4 is a schematic illustration of a radioisotope production apparatus comprising beam distributing apparatuses.

FIG. 4 schematically illustrates an alternative arrangement of a radioisotope production apparatus RI. In FIG. 4, a plurality of electron beam distribution apparatuses are provided to distribute the electron beam E over a face of the target 30. Generally, the electron beam distribution apparatuses may be provided in the form of either, or a combination of deflectors and/or magnets, such as quadrupoles.

In the depicted example embodiment of FIG. 4, a first electron beam distribution apparatus is provided in the form of a deflector 50 disposed in the path of the electron beam E and configured to sweep the electron beam E through an angle. In the particular example of FIG. 4, the deflector 50 is configured to sweep the electron beam E over the surface of a second electron beam distribution apparatus. This may be achieved by applying a continuously varying voltage to plates of the deflector 50. The second electron beam distribution apparatus may take the form of a second deflector 60 arranged to deflect the electron beam E such that it impacts telecentrically on the surface of the target 30. In other embodiments, the second electron distribution apparatus 60 may take the form of a lens used to collimate the electron beam E. Collimation of the electron beam E is useful because a diverging electron beam would increase the divergence of photons generated. This would in turn require larger targets in order to collect the photons, which would reduce the specific activity of Mo-99 (or other radioisotope) generated at the targets. The lens may, for example, be formed from magnets, and may be a multipole (e.g. quadrupoles, hexapoles, octupoles) lens.

Together, the first and second distribution apparatus cause the electron beam E to be distributed across a larger area of the target 30, thereby distributing the thermal load and consequently reducing cooling requirements. Further, where a lens is used as the second electron beam distribution apparatus 60, the strength of the lens may be dynamically adjusted to obtain a desired focal point of the electron beam E. By moving the focal point further downstream, it is possible to increase the quantity of photons generated but at the expense of a higher thermal load on the irradiated portion of the target 30.

It will be appreciated that other arrangements of distribution apparatuses may be used. For example, in other embodiments, the first distribution apparatus may be provided in the form of a lens arranged to defocus and therefore enlarge the electron beam E to desired dimensions at the second distribution apparatus 60. Generally, any combination of static electron beam distribution apparatuses (e.g. lenses) and dynamic electron beam distribution apparatuses (e.g. deflectors) may be used.

Figure 5:
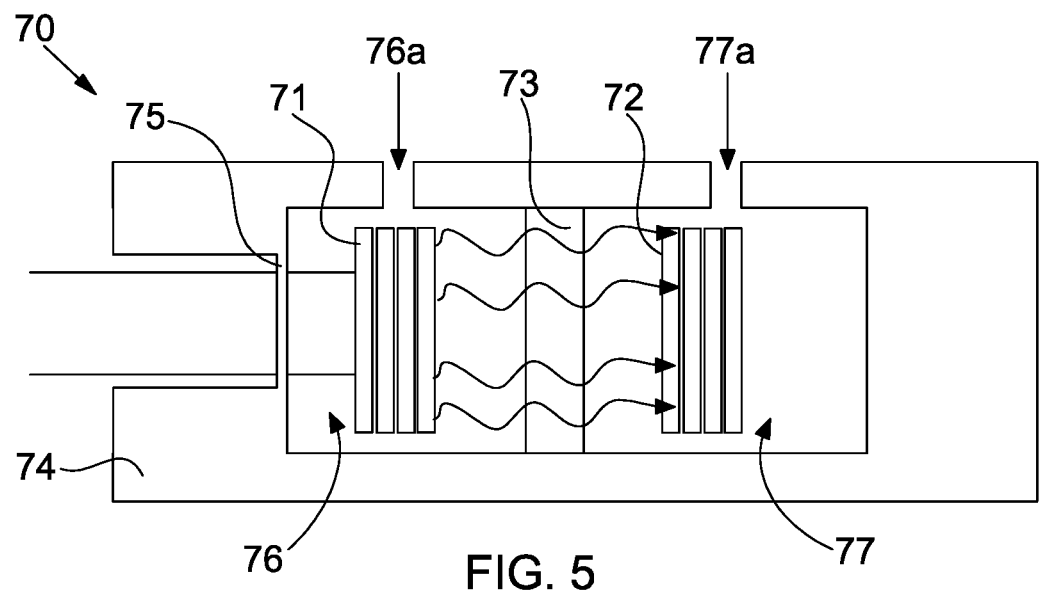
FIGS. 5, 6a, 6b and 7 are schematic illustrations of dynamic electron target arrangements for a radioisotope production apparatus.

FIG. 5 schematically illustrates a target arrangement 70, which may be used with a radioisotope production apparatus. The target 70 comprises an electron target 71 held by a support structure (not shown) and a photon target 72 held by a support structure (not shown). The electron target 71 is separated from the photon target 72 via a window 73 through which photonic radiation can pass. The targets 71, 72 are mounted within a housing 74. The housing 74 comprises a window 75 through which an electron beam is directed towards the electron target 71 as described above.

The housing 74 and the window 73 together define two chambers, isolated from one another: a first chamber 76 containing the electron target 71 and a second chamber 77 containing the photon target 72. By isolating each of the chambers 76, 77, each of the electron target 71 and the photon target 72 may be cooled separately. In this way, the electron target 71 may be subject to more effective cooling than can be applied to the photon target 72. For example, where the photon target 72 is Mo-100, this may prevent liquid cooling due to the solubility of Mo-100 in a liquid coolant. However, as described above, the electron target 71 may be made from a different material, such as Tungsten or Tantalum which would not be soluble in a liquid coolant. As such, it may be desirable to cool the electron target with a liquid coolant while cooling the photon target with a gas coolant. In the depicted example, the chamber 76 is cooled by a flow of water 76a, while the photon target 72 is cooled by a flow of helium (He) 77a. In some embodiments, the coolants used to cool the photon target 72 and the electron target 71 may be at different pressures. For example, as the cooling properties of flowing He are relatively poor in comparison to the cooling properties of flowing water, the coolant supplied to the photon target may be supplied at a higher pressure. By way of example, in the target arrangement 70 of FIG. 5, the water coolant 76a may be supplied at a pressure of 1 bar (100 kPa), while the helium coolant 77a may be supplied at a pressure of 70 bar (7000 kPa).

Either or both of the windows 73, 75 may be constructed from, for example, a thin layer of Silicon Carbide, or other suitable material. It will be appreciated that the windows should allow transmission of the electron beam E and/or photons, be thermally stable and able to withstand pressure differences between the environment of the electron beam (which may be vacuum) and the pressure differences between the first and second chambers 76, 77.

As indicated above, in some embodiments, a window is provided to separate the photon target from either the vacuum in which the electron beam is generated (e.g. where no separate electron target is provided) or the electron target (e.g. where a separate electron target is provided). In some embodiments, the window which separates the photon target from other areas may be dome-shaped so as to better withstand the pressure differential between the chamber housing the photon target and the adjacent area. For example, with reference to FIG. 5, the window 73 may be dome shaped to better withstand the 69 bar pressure differential between the chambers 76, 77 while remaining sufficiently thin (as measured in the direction of propagation of the electron beam E to allow photons to pass through the window 73 in sufficient quantities to impact the photon target 72.

Similarly, where the photon target is adjacent the vacuum through which the electron beam E propagates, a pressure differential of, for example, 70 bar may be present (where as described above, for example, Hydrogen gas cooling is provided at a pressure of 70 bar). As such, the window separating the photon target with the vacuum may be dome shaped. Such dome-shaped windows may be manufactured using chemical vapour deposition (CVD) of SiC, for example. In order to ensure resilience to forces acting upon the windows, the windows may have a curvature of between 85 to 4000 mm. Such a CVD-SiC dome-shaped window would be suitable for hermetic sealing, able to withstand high temperatures, conduct currents and cope with the pressure difference between different areas of the target.

Figure 6A:
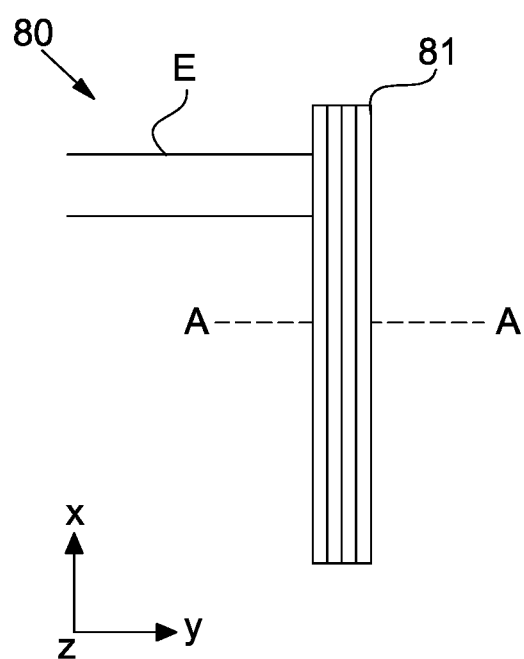
Figure 6B:
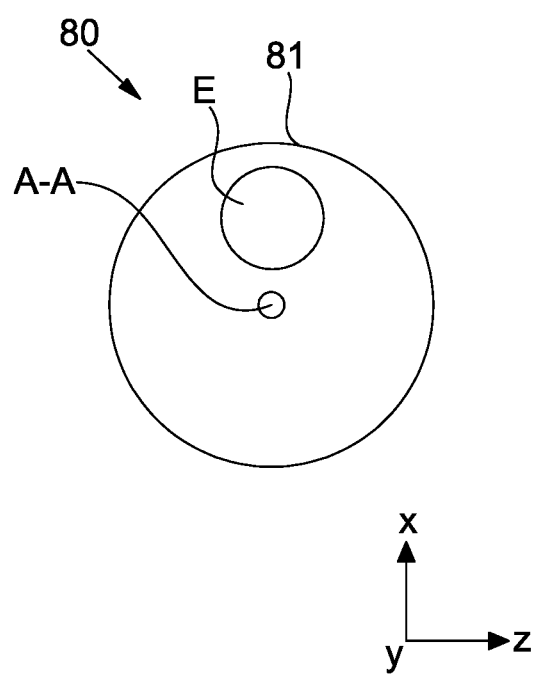

FIGS. 6a, 6b schematically depict a dynamic electron target arrangement 80 according to an embodiment described herein. FIG. 6a depicts a side-view of the arrangement 80 (in a plane parallel to the direction of propagation of the electron beam E) while FIG. 6b depicts the arrangement 80 in a plane perpendicular to the direction of propagation of the electron beam E. The arrangement 80 comprises an electron target 81, which, while depicted as a plurality of circular plates in FIGS. 6a, 6b, may take any appropriate form as described above. For example, the electron target 81 may comprise a plurality of plates of any shape, such as rectangular plates.

The electron target 81 is configured to be rotated about an axis A-A depicted as being at a center-point of the electron target 81. For example, the electron target 81 may be mounted on an axle defining the axis A-A and suitable actuators may be provided to rotate the axle and thereby the electron target 81. It will be appreciated, however, that the electron target 81 may be caused to rotate about the axis A-A in any suitable manner. Further, it is to be understood that the axis A-A need not be centrally disposed within the electron target 81.

During use, the electron target 81 is rotated about the axis A-A such that a different portion of the target 81 is exposed to the electron beam E at different times during an exposure. In this way, the heat imparted to the electron target 81 is distributed more uniformly over the surface of the electron target 81, thereby reducing the cooling. In other embodiments, the electron beam E may be moved over the surface of the target 81 target without the need to rotate the 81.

Figure 7:
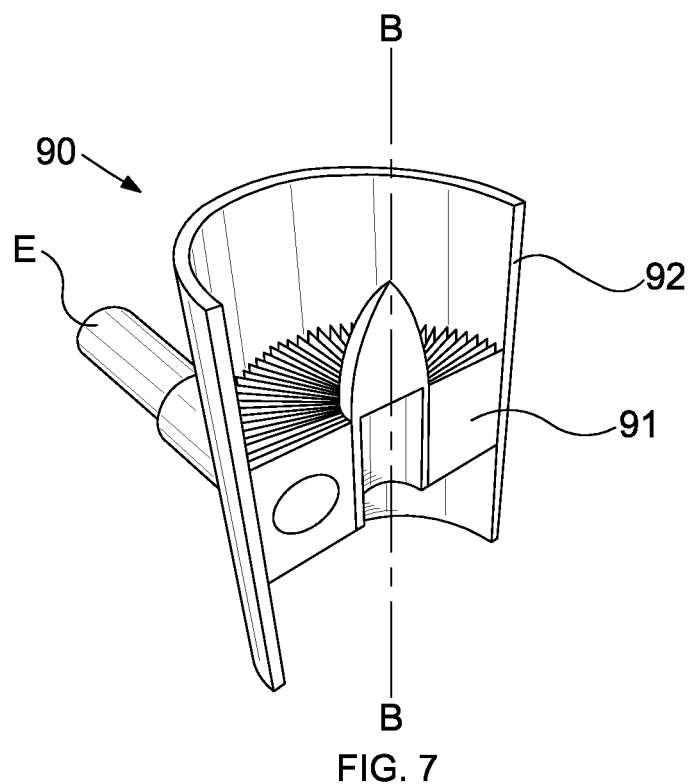

FIG. 7 depicts an alternative dynamic electron target arrangement 90 in which an electron target 91 comprises a plurality of rectangular plates arranged cylindrically around an axis B-B. As in the arrangement 80, the electron target 91 is configured to be rotated about the axis B-B so as to expose different ones of the plates forming the electron target 91 (or simply different portions of the electron target 91 where the electron target 91 does not comprise a plurality of plates) to the electron beam E. A pipe 92 surrounds the electron target 91 and provides a conduit for a coolant (e.g., water) to be sent through the electron target 91.

Figure 8:
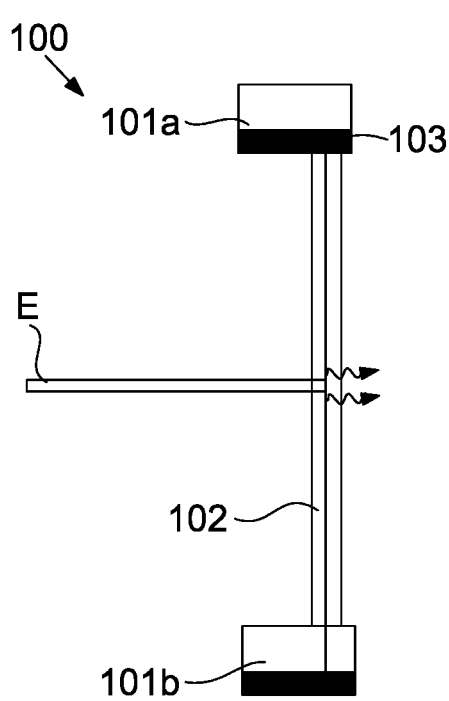
FIG. 8 is a schematic illustration of an electron target arrangement for a radioisotope production apparatus utilizing a liquid electron target.

FIG. 8 schematically depicts an alternative dynamic electron target arrangement 100 in which an electron target is provided in the form of a "curtain" of liquid through which the electron beam E is directed. In FIG. 8, an electron target reservoir 101a is connected to an electron target trap 101b via a supply pipe 102. The electron target reservoir 101a supplies (e.g. through the action of a pump) an electron target 103 in the form of a liquid to the supply pipe 102 through which the electron target 103 flows to the electron target reservoir 101b. The electron beam E is directed towards the electron target 103 flowing through the supply pipe 102. The electron target 103 may be, for example, PbBi or Hg. The electron target may be recirculated from the electron target trap 101b to the electron target reservoir 101a via recirculation pipes (not shown) and may be cooled during recirculation. By providing a flowing electron target 103 in the form of a liquid, the effectively surface area of the electron target is increased, thereby improving distribution of the heat load imparted to the electron target 103 by the electron beam E. Additionally, the flow of the electron target 103 is such that heat is automatically removed from the vicinity of the electron beam E.

In an alternative arrangement Lead-Bismuth Eutectic (LBE) may be used as both the electron target and a coolant liquid. LBE provides an advantage in that it has a higher boiling point than other coolant liquids (e.g. water). Other suitable liquids may be used as both the electron target and a coolant liquid.

In an embodiment, a bearing is provided between the electron target 103 and the other surfaces within the arrangement 100. For example, a bearing may be provided in the form of a curtain of water between the liquid electron target 103 and other surfaces of the arrangement 100.

Figure 9:
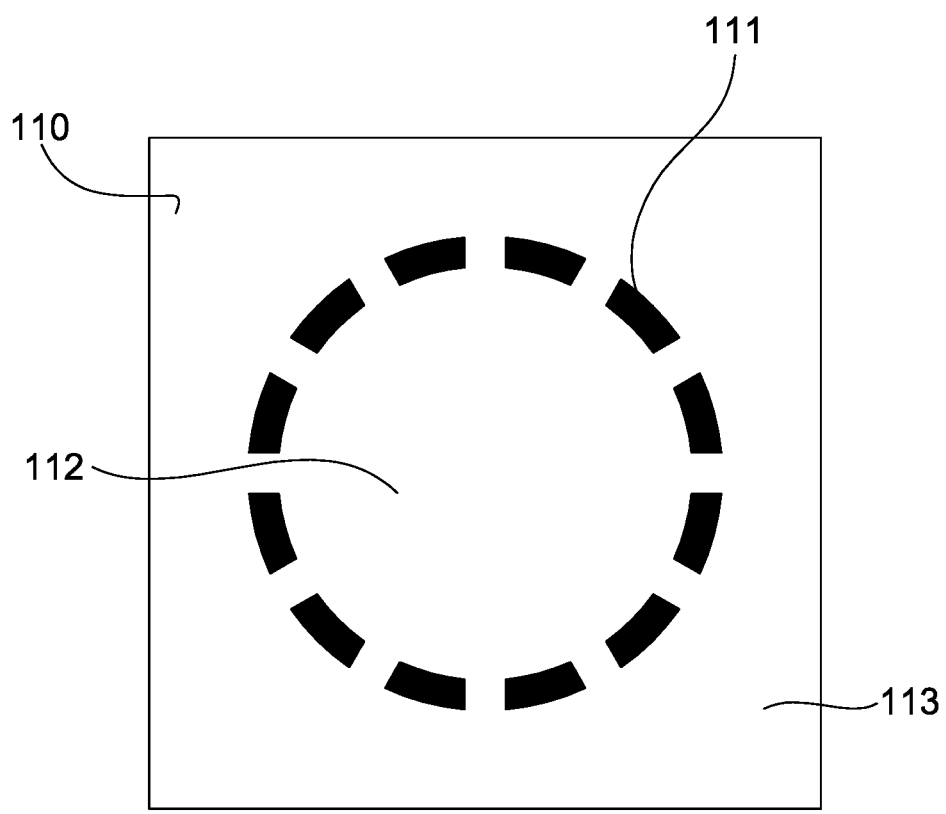
FIG. 9 is a schematic illustration of a radioisotope produced in accordance with a described arrangement.

FIG. 9 schematically illustrates a photon target 110 in the form of a square plate of, for example, Mo-100. The photon target 110 may be, for example, a combined photon and electron target, or a separate photon target, as discussed above. In the depiction of FIG. 9, the photon target 110 has been processed to create perforations 111 to define a central portion 112 and an outer portion 113 of the photon target 110. Generally, the Specific Activity of a photon target will vary radially, with a central portion having a higher Specific Activity than an outer portion. Furthermore, some applications demand or prefer radioisotopes having particular Specific Activities. As such, by separating the photon target 110 into a plurality of portions, the different regions can be provided to different parties for different applications. The perforations 111 in the photon target 110 allow easy separation of the radial portions 112, 113 but it will be recognized from the above that such perforations are not an essential feature of the embodiment. Other methods to separate portions of the photon target, either before or after exposure to the electron beam E, may be used, such as, for example, presses, cutting, etc. as will be readily apparent to the skilled person.

Figure 10:
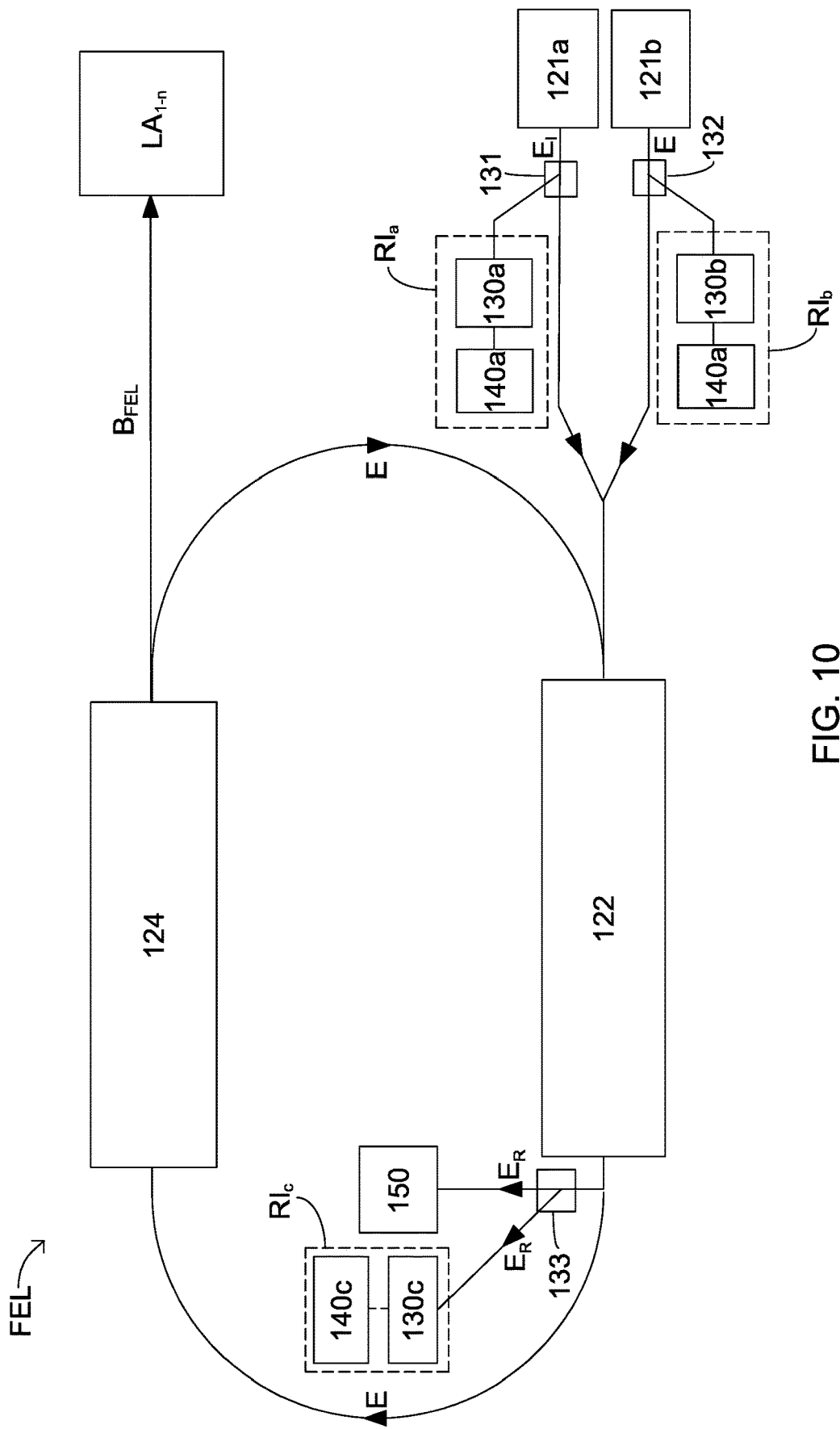
FIG. 10 is a schematic illustration of part of a system comprising a free electron laser and a radioisotope production apparatus according to an embodiment of the invention.

FIG. 10 schematically shows an example of a system which comprises a free electron laser FEL and radioisotope production apparatus $RI_{a-c}$. The free electron laser FEL is capable of generating an EUV radiation beam $B_{FEL}$ which is sufficiently powerful to supply a plurality of lithographic apparatus $LA_{1-n}$ with EUV radiation beams that may be used to project patterns onto substrates.

The free electron laser FEL comprises two electron injectors 121a,b, a linear accelerator 122, an undulator 124 and a beam dump 150. The free electron laser may also comprise a bunch compressor (not illustrated). The system in FIG. 10 can be switched between different modes of operation in which an electron beam E follows different paths. In the illustrated mode the electron beam E is depicted by a solid line, with alternative electron beam paths being depicted by a dashed line.

In the depicted mode of operation the second electron injector 21b provides an electron beam E which is used by the free electron laser to generate an EUV radiation beam $B_{FEL}$. The first electron injector 21a provides an electric beam $E_I$ which is used to generate radioisotopes as described above.

Following acceleration by the linear accelerator 122 the electron beam E is steered to the undulator 24 by magnets (not shown). Optionally, the electron beam E may pass through a bunch compressor (not shown), disposed between the linear accelerator 122 and the undulator 24. The bunch compressor may be configured to spatially compress existing bunches of electrons in the electron beam E.

The electron beam E then passes through the undulator 24. Generally, the undulator 24 comprises a plurality of modules. Each module comprises a periodic magnet structure, which is operable to produce a periodic magnetic field and is arranged so as to guide the electron beam E produced by the electron injector 121a,b and linear accelerator 122 along a periodic path within that module. The periodic magnetic field produced by each undulator module causes the electrons to follow an oscillating path about a central axis. As a result, within each undulator module, the electrons radiate electromagnetic radiation generally in the direction of the central axis of that undulator module. The radiated electromagnetic radiation forms a beam $B_{FEL}$ of EUV radiation which is passed to lithographic apparatus $LA_{1-n}$ and is used by those lithographic apparatus to project patterns onto substrates.

The path followed by the electrons may be sinusoidal and planar, with the electrons periodically traversing the central axis. Alternatively, the path may be helical, with the electrons rotating about the central axis. The type of oscillating path may affect the polarization of radiation emitted by the free electron laser. For example, a free electron laser which causes the electrons to propagate along a helical path may emit elliptically polarized radiation, which may be desirable for exposure of a substrate W by some lithographic apparatus.

As electrons move through each undulator module, they interact with the electric field of the radiation, exchanging energy with the radiation. In general the amount of energy exchanged between the electrons and the radiation will oscillate rapidly unless conditions are close to a resonance condition. Under resonance conditions, the interaction between the electrons and the radiation causes the electrons to bunch together into microbunches, modulated at the wavelength of radiation within the undulator, and coherent emission of radiation along the central axis is stimulated. The resonance condition may be given by:

$$\lambda_{em} = \frac{\lambda_u}{2\gamma^2}\left(1 + \frac{K^2}{A}\right), \quad (1)$$

where $\lambda_{em}$ is the wavelength of the radiation, $\lambda_u$ is the undulator period for the undulator module that the electrons are propagating through, γ is the Lorentz factor of the electrons and K is the undulator parameter. A is dependent upon the geometry of the undulator 24: for a helical undulator that produces circularly polarized radiation A=1, for a planar undulator A=2, and for a helical undulator which produces elliptically polarized radiation (that is neither circularly polarized nor linearly polarized) 1<A<2. In practice, each bunch of electrons will have a spread of energies although this spread may be minimized as far as possible (by producing an electron beam E with low emittance). The undulator parameter K is typically approximately 1 and is given by:

$$K = \frac{q\lambda_u B_0}{2\pi mc}, \tag{2}$$

where q and m are, respectively, the electric charge and mass of the electrons, $B_0$ is the amplitude of the periodic magnetic field, and c is the speed of light.

The resonant wavelength $\lambda_{em}$ is equal to the first harmonic wavelength spontaneously radiated by electrons moving through each undulator module. The free electron laser FEL may operate in self-amplified spontaneous emission (SASE) mode. Operation in SASE mode may require a low energy spread of the electron bunches in the electron beam E before it enters each undulator module. Alternatively, the free electron laser FEL may comprise a seed radiation source, which may be amplified by stimulated emission within the undulator 24. The free electron laser FEL may operate as a recirculating amplifier free electron laser (RAFEL), wherein a portion of the radiation generated by the free electron laser FEL is used to seed further generation of radiation.

The electron beam E which exits the undulator 124 is steered by magnets (not shown) back into the linear accelerator 122. The electron beam E enters the linear accelerator 122 with a phase difference of 180 degrees relative to the electron beam produced by the electron injector 121a,b. The RF fields in the linear accelerator therefore serve to decelerate the electrons which are output from the undulator 24 and to accelerate electrons output from the electron injector 121a,b. As the electrons decelerate in the linear accelerator 122 some of their energy is transferred to the RF fields in the linear accelerator 122. Energy from the decelerating electrons is therefore recovered by the linear accelerator 122 and is used to accelerate the electron beam E output from the electron injector 121. Such an arrangement is known as an energy recovery linear accelerator (ERL).

After deceleration by the linear accelerator 122, the electron beam $E_R$ is absorbed by a beam dump 150. The beam dump 150 may comprise a sufficient quantity of material to absorb the electron beam $E_R$. The material may have a threshold energy for induction of radioactivity. Electrons entering the beam dump 150 with an energy below the threshold energy may produce only gamma ray showers but will not induce any significant level of radioactivity. The material may have a high threshold energy for induction of radioactivity by electron impact. For example, the beam dump 150 may comprise aluminium (Al), which has a threshold energy of around 17 MeV. The energy of electrons of the electron beam E after leaving the linear accelerator 122 may be less than 17 MeV (it may for example be around 10 MeV), and thus may be below the threshold energy of the beam dump 150. This removes, or at least reduces, the need to remove and dispose of radioactive waste from the beam dump 150.

In addition to comprising a free electron laser FEL and lithographic apparatus $LA_{1-n}$, the system depicted in FIG. 1 further comprises radioisotope production apparatus $RI_{a-c}$. Three radioisotope production apparatus $RI_{a-c}$ are depicted, each of which has the same general configuration. In particular, each radioisotope production apparatus $RI_{a-c}$ comprises a linear accelerator $130_{a-c}$ and a target arrangement $140_{a-c}$. Additionally, it is to be understood that the radioisotope production apparatus $RI_{a-c}$ may comprise or utilize any of the arrangements and features described above with reference to FIGS. 1 to 9.

Generally, referring again to FIG. 10, production of a radioisotope using the first radioisotope production apparatus $RI_a$ is performed when the electron beam $E_I$ generated by the first electron injector 21a is not being used by the free electron laser FEL to generate an EUV radiation beam $B_{FEL}$. A deflector 131 directs the electron beam $E_I$ towards the first radioisotope production apparatus $RI_a$. The second electron injector 121b is operable to provide an electron beam E to the free electron laser FEL during this time. A deflector 132 provided after the second electron injector 121b does not direct the electron beam E towards the second radioisotope production apparatus, but instead allows the electron beam to travel to the linear accelerator 122. The two electron injectors 121a,b are operating simultaneously, the first electron injector 121a providing an electron beam which is used to generate radioisotopes and the second electron injector 121b providing an electron beam which is used by the free electron laser FEL to generate an EUV radiation beam $B_{FEL}$.

The second radioisotope production apparatus $RI_b$ has the same general configuration as the first radioisotope production apparatus $RI_a$ and thus comprises a linear accelerator 130b and a target 140b. When the second electron injector 121b is providing an electron beam used by the radioisotope production apparatus $RI_b$ to generate radioisotopes, the first electron injector 121a provides an electron beam used by the free electron laser FEL to generate an EUV radiation beam $B_{FEL}$. The paths travelled by electron beams E are thus opposite to those depicted in FIG. 10. Switching of the electron beam paths is achieved by switching the configurations of the deflectors 131, 132. The first deflector 131 no longer directs the electron beam generated by the first electron injector 121a to the first radioisotope production apparatus $RI_a$ but instead allows the electron beam to travel to the linear accelerator 122 of the free electron laser. The second deflector 132 directs the electron beam generated by the second electron injector 121b to the second radioisotope production apparatus $RI_b$.

The third radioisotope production apparatus $RI_c$ is located after the linear accelerator 122. The linear accelerator 122 is an energy recovery linear accelerator, and provides an electron beam $E_R$ from which energy has been recovered. This electron beam $E_R$ has an energy which substantially corresponds to the energy of the electron beam E provided from an electron injector 121a,b before it is accelerated by the linear accelerator 122. The energy of the electron beam as output from the electron injector 121a,b and following energy recovery in the linear accelerator 122 may, for example, be around 10 MeV.

In common with the previously described radioisotope production apparatus, the third radioisotope production apparatus $RI_c$ comprises a linear accelerator 130c which is configured to increase the energy of the electrons in the electron beam. The linear accelerator 130c may, for example, accelerate electrons to an energy of 15 MeV or more. The linear accelerator 130c may accelerate electrons to an energy of 30 MeV or more (e.g. up to around 45 MeV). In an embodiment, the linear accelerator 130c may accelerate electrons to an energy of around 35 MeV. The radioisotope production apparatus further comprises a target 140c.

When radioisotope production is not required using the third radioisotope production apparatus $RI_c$, the electron beam $E_R$ is directed to the beam dump 150 instead of being directed to the third radioisotope production apparatus. In FIG. 10 the electron beam is directed to the beam dump 150 (as indicated by a solid line), and is not directed to the third radioisotope production apparatus $RI_c$ (as indicated by a dashed line). However, the electron beam $E_R$ may be directed by a deflector 133 towards the third radioisotope production apparatus $RI_c$. In an embodiment, the third radioisotope production apparatus $RI_c$ may be operative to produce radio isotopes at the same time as the first (or second) radioisotope production apparatus $RI_a$, $RI_b$.

A merger (not shown) may be used to combine the electron beam provided by the electron injector 121a,b with the recirculating electron beam E. A demerger (not shown) may be used to separate the electron beam $E_R$ from which energy has been recovered and the electron beam E which has been accelerated by the linear accelerator 122.

Although FIG. 10 shows radioisotope production apparatus $RI_{a-c}$ located both before and after the linear accelerator 122 of the free electron laser FEL, in other embodiments the radioisotope production apparatus may be provided in only one of those locations (i.e. provided only before the linear accelerator or provided only after the linear accelerator). More generally, it will be appreciated that FIG. 10 is merely exemplary and that other arrangements may be provided. For example, in an embodiment, a single electron injector may be provided with a single radioisotope production apparatus.

Although the embodiment illustrated in FIG. 10 is an energy recovery linear accelerator, the radioisotope production apparatus may be provided as part of a system which comprises a free electron laser FEL with an accelerator which is not an energy recovery linear accelerator. For example, radioisotope production apparatus may be provided after one or more electron injectors of a free electron laser which comprises a linear accelerator that is not an energy recovery linear accelerator.

Although only a single linear accelerator 122 is depicted in FIG. 10, the free electron laser FEL may comprise two or more linear accelerators. For example, a linear accelerator may be provided at the position at which the undulator 124 is depicted in FIG. 10. Where this is the case, the electron beam may pass through the linear accelerators a plurality of times such that the electron beam is accelerated by each linear accelerator two or more times. In such an arrangement, a beam de-merger may be used to separate the accelerated electron beam such that it passes through an undulator to generate an EUV radiation beam. A beam merger may then be used to direct the electron beam from the undulator back into the linear accelerators for subsequent deceleration.

FIGS. 11a to 11h schematically depict exemplary targets 150a-150f, which may be used, for example, with any one of the radioisotope production apparatuses shown in FIGS. 1, 4 and 10. FIGS. 11a, 11b, 11d, 11f, and 11g show top views of the targets 150a-150e.

The targets 150a-150e shown in FIGS. 11a to 11g each comprises a plurality of spaced portions 151a. Each of the targets 150a-150e shown in FIGS. 11a to 11g is configured to expand when the target is subjected to an electron beam E (only shown in FIG. 11f) such that contact between the plurality of portions 151a is prevented. Each of the targets 150a-150e may be configured to expand such that a gap or space 151b between adjacent portions of the plurality of portions 151a is maintained.

Referring to FIGS. 11a to 11e, the targets 150a to 150c may each comprise a plurality of contact points 151c at which adjacent portions of the plurality of portions 151a are in contact. The targets 150a-150c may each comprise a plurality of openings 151d arranged to extend between the at least two contact points of the plurality of contact points 151c. The space or gap 151b may be part of or comprised in the plurality of openings 151d. The plurality of openings 151d may be configured for receiving a flow of coolant there through.

Figure 11A:
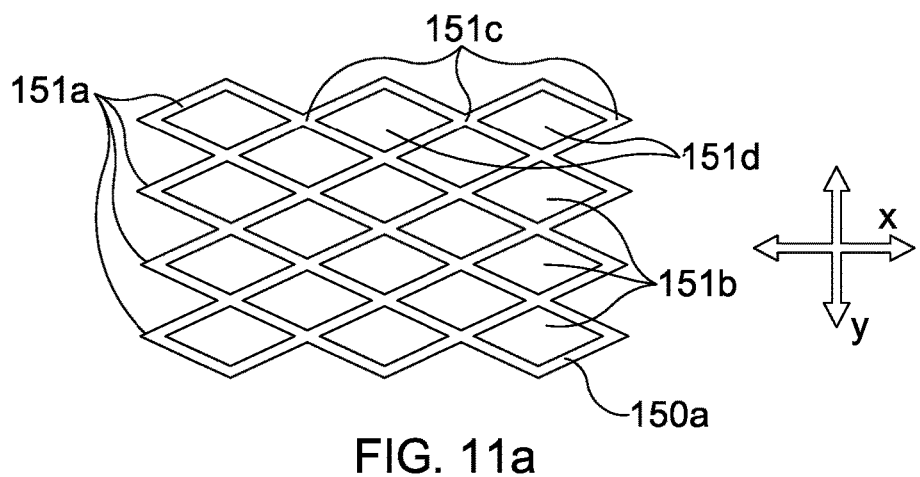
FIGS. 11a to 11h are schematic illustrations of a target for a radioisotope production apparatus.

The target 150a shown in FIG. 11a comprises a flexible or deformable target 150a. The target 150a may be configured to expand in one or two directions, for example when the target is subjected to the electron beam E. For example, when the target 150a is subjected to heat caused by the electron beam E, the target 150a may freely expand, for example in one or two directions, such as one or two substantially transverse directions, which are indicated as x- and y-directions in FIG. 11a. This may allow the target 150a to expand, for example, when the target 150a is subjected to heat caused by the electron beam E, without blocking of the space or gap 151b between adjacent portions of target. By preventing blocking of the space or gap 151b between adjacent portions of the target 150b, a coolant may be able to flow between the plurality of portions of the target 150a and thus, overheating and/or melting of the target 150a may be prevented. The target 150a is shown in FIG. 11a as comprising a lattice-type structure. It will be appreciated that in other embodiments the target may comprise or a honeycomb structure or the plurality of openings may have a circular, squared or rectangular shape or the like.

Figure 11B:
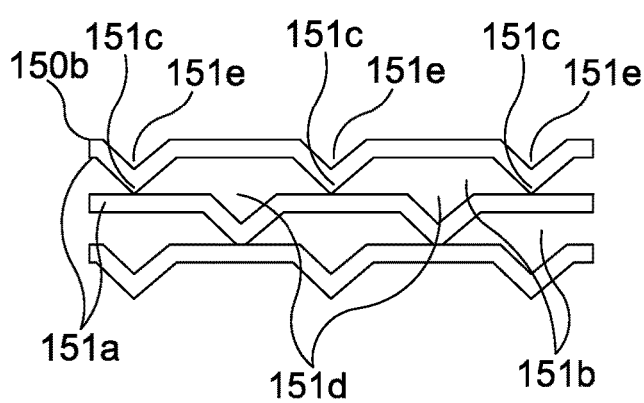
Figure 11C:
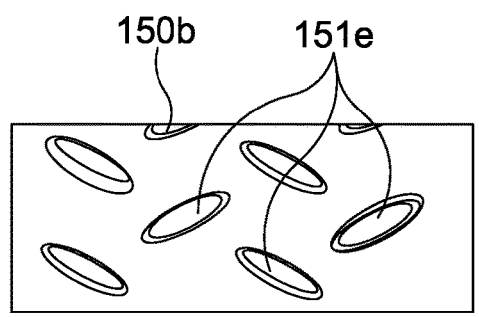
Figure 11D:
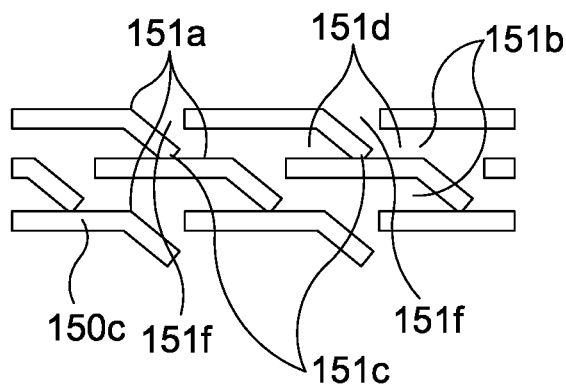
Figure 11E:
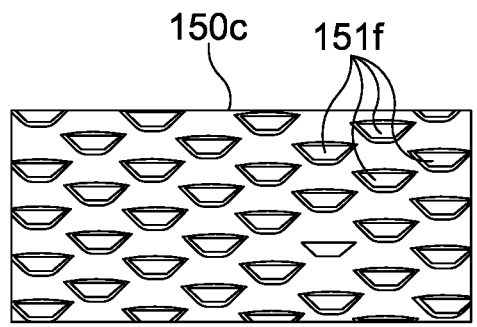

Referring to FIGS. 11b to 11e, the plurality of portions 151a of the targets 150b, 150c may comprises a plurality of target elements 151a. In the embodiments shown in FIGS. 11b and 11d the plurality of target elements 151a are arranged to form the target 150b, 150c. For example, the target elements 151a may be stacked or joint together to form the target 150b, 150c. In the embodiment shown in FIGS. 11b and 11c, each target element 151a comprises a plurality of grooves. In the embodiments shown in FIGS. 11d and 11e each target element 151a comprises plurality of through-holes 151f. The plurality of grooves 151e or through-holes 151f may be arranged in the target elements 151a to provide the plurality of openings 151d and contact points 151c, for example, when the target elements 151a are joint together to form the target 150b, 150c. The plurality of grooves 151e may be provided in the form of a plurality of corrugations. The plurality of through-holes 151f may be provided in the form of a plurality of punched holes. FIGS. 11b and 11d each show a top view of three target elements 151a joint to each other. It will be appreciated that in other embodiments, there may be provided more or less than three target elements.

The plurality of through-holes 151f or corrugations 151e in the target plates 150b, 150c may lead to an increased transfer of heat, for example, when the target 150a, 150c is subjected to heat caused by the electron beam E. This may prevent blocking of the space 151b between adjacent target elements 151a and the coolant may be allowed to flow between the target elements 151a. Therefore, overheating and/or melting of the target 150b, 150c may be prevented.

Figure 11F:
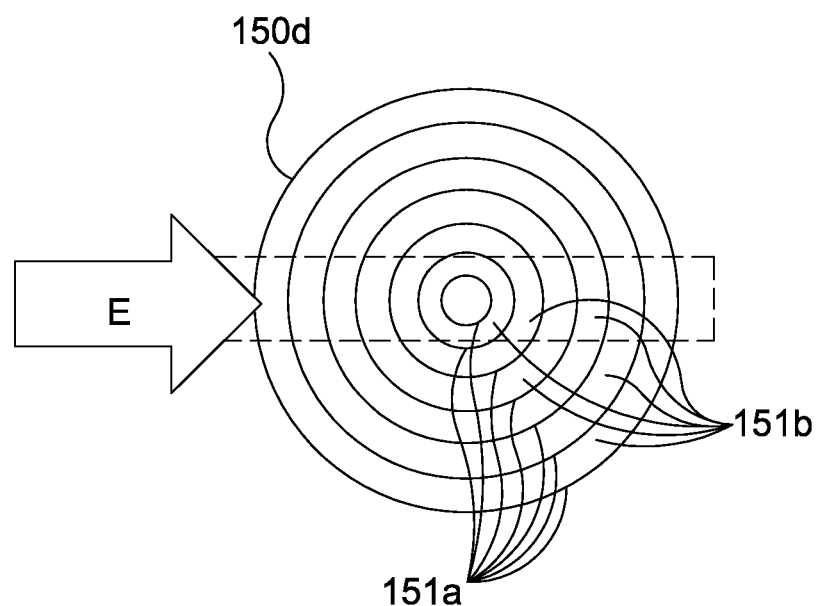
Figure 11G:
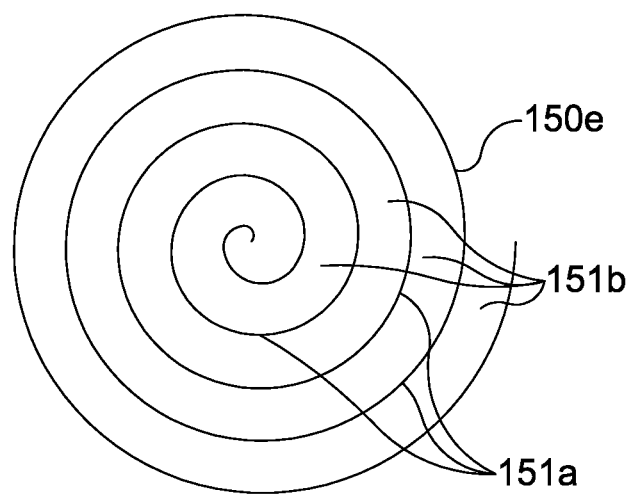

The exemplary target 150d shown in FIG. 11f comprises a plurality of portions 151a, which are concentrically arranged to each other. The exemplary target 150e shown in FIG. 11g comprises a plurality or portions 151a, which are arranged to form a helical or spiral structure. The concentric arrangement of the target 150d and/or the spiral or helical structure of the target 150e may allow the targets 150d, 150e to freely expand, e.g. when each of targets is subjected to heat caused by the electron beam E, without blocking or obstructing the space 151b between adjacent portions 151a of the targets 150d, 150e. Therefore, overheating and/or melting of the targets may be prevented. As shown in the top view of the exemplary target 150d in FIG. 11f, the electron beam E may be directed on the targets 150d, 150e in a direction substantially perpendicular to a central or longitudinal axis of the targets 150d, 150e.

Figure 11H:
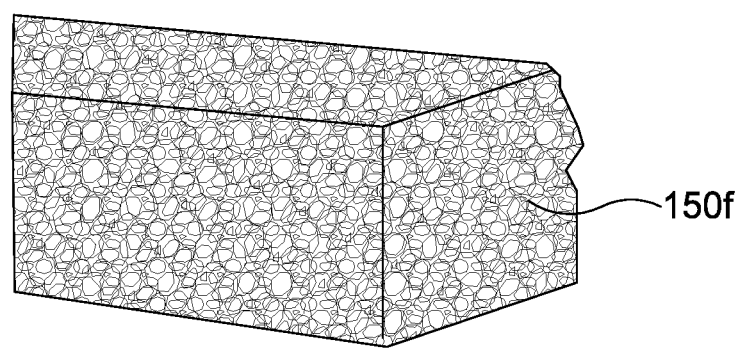

FIG. 11h shows another exemplary target 150f for use with a radioisotope production apparatus. The target 150f is configured to expand, for example, when the target is subjected to the electron beam E such that flow of a coolant through the target is allowed. The target 150f may comprise a porous structure or material. The porous structure or material may comprise a foam or sintered material. For example, when subjected to heat caused by the electron beam E the porous structure or material of the target 150f may allow the target 150f to internally deform. Due to the porosity of the target 150f, flow of coolant through the target 150f may be maintained and overheating and/or melting of the target 150f may be prevented.

Figure 12A:
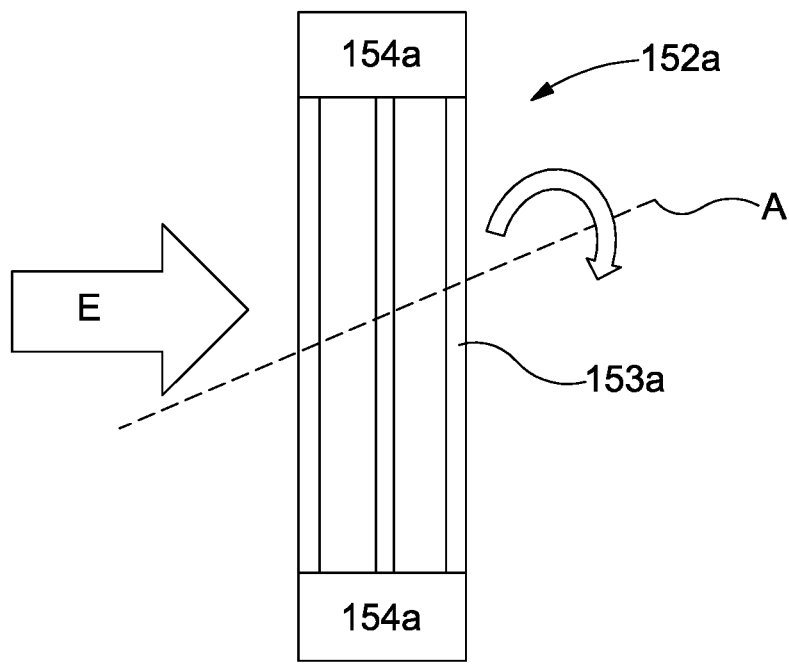
FIGS. 12a and 12b are schematic illustration of a target arrangement for a radioisotope production apparatus.
Figure 12B:
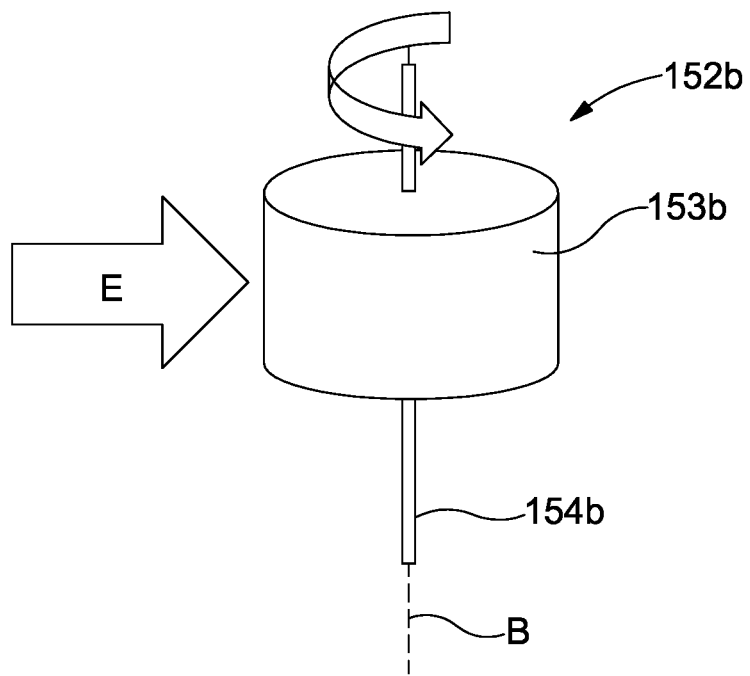

FIGS. 12a and 12b show exemplary target arrangements 152a, 152b, which may be used, for example, with any one of the radioisotope production apparatuses shown in FIGS. 1, 4 and 10. The target arrangements 152a, 152b each comprise a target 153a, 153b and a target support 154a, 154b. The target 153a, 153b may be or include any one of the targets described above. The target support 154a, 154b may be configured to move or rotate the target 153a, 153b relative to the electron beam E. By configuring the target support 154a, 154b to rotate or move the target 153a, 153b relative to the electron beam E, uniform activation of the target 153a, 153b may be achieved, which may lead to an increased radioisotope production. This may lead to a reduction of the thermal load on the target, e.g. a portion of the target. Alternatively or additionally, by configuring the target support 154a, 154b to rotate or move the target 153a, 153b relative to the electron beam E, it may be possible to direct the electron beam E onto the target 153a, 153b from one side only. This may make the use of a beam splitter, e.g. a kicker, which splits the electron beam E along two propagation paths, as described above, and which may be a complex part, unnecessary. Alternatively or additionally, this may avoid the use of long beam lines and may reduce the amount of magnets and metrology required in such beam lines, which may lead to reduced beam line and/or radioisotope production costs. Alternatively or additionally, the target support 154a, 154b may be configured to moveably or rotatably mount the respective target 153a, 153b, for example, to allow movement or rotation of the target 153a, 153b relative to the electron beam E.

The exemplary target support 154a shown in FIG. 12a is configured to move or rotate the target 153a, for example, about a transverse axis A, e.g. an axis extending in a direction substantially perpendicular to a longitudinal axis of the target 153a. The target support 154a may be configured to rotate or move the target 153a by 180 degrees, for example, to allow for alternate exposure of each side of the target 153a to the electron beam E. It will be appreciated that in other embodiments the target support may be configured to rotate or move the target about a longitudinal axis of the target.

The exemplary target support 154b shown in FIG. 12b is configured to rotate move of the target 153b about a longitudinal axis B of the target 153b. The exemplary target 153b shown in FIG. 12b includes a cylindrical target 153b. It will be appreciated that in other embodiments the target may have a different shape, such as squared or rectangular shape, and/or may include a plurality of target plate, which may be of a squared, circular, rectangular shape.

The exemplary target arrangements shown in FIGS. 12a and 12b may include an actuator (not shown), which may be provided in the form of a motor or the like. The target 153a, 153b may be mounted on an axle defining the axis A or axis B and the actuator may be coupled or connected to the target support 154a, 154b (or a portion thereof) to cause movement or rotation of the target 153a, 153b relative to the electron beam E. It will be appreciated that the target 153a, 153b may be caused to rotate or move about the axis A or axis B in any suitable manner. Further, it is to be understood that the axis A or axis B need not be centrally disposed with the target 153a, 153b.

Figure 13A:
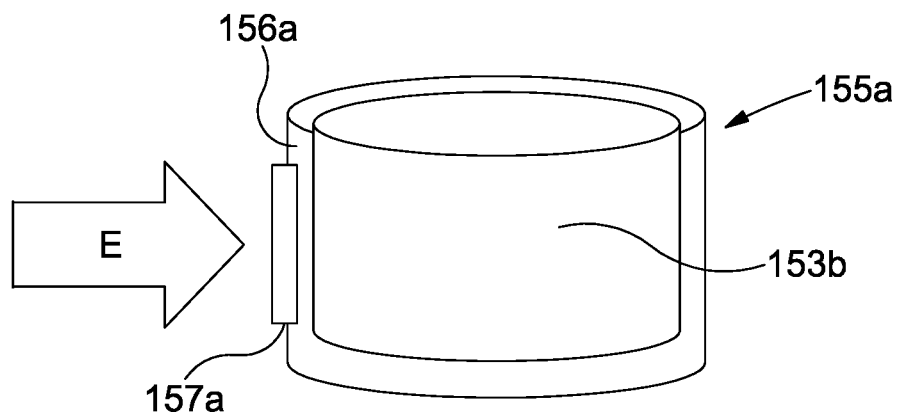
FIG. 13a is a schematic illustration of a target arrangement for a radioisotope production apparatus comprising a housing and window.
Figure 13B:
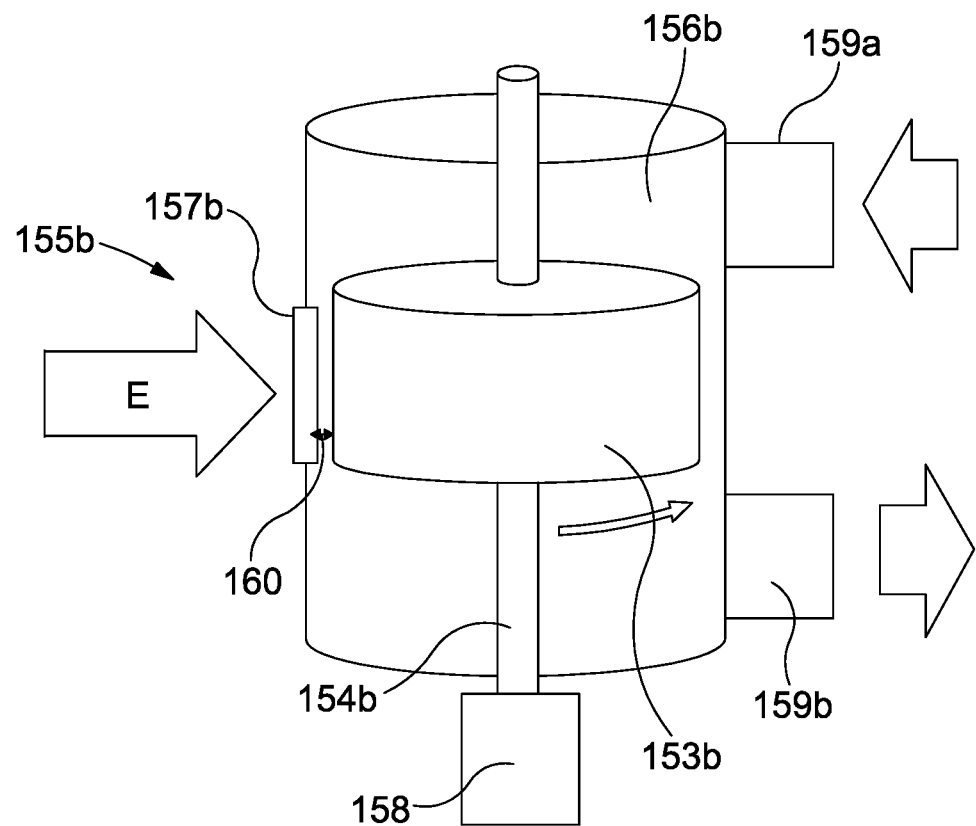
FIG. 13b is a schematic illustration of a target arrangement for a radioisotope production apparatus comprising a moveable target.
Figure 13C:
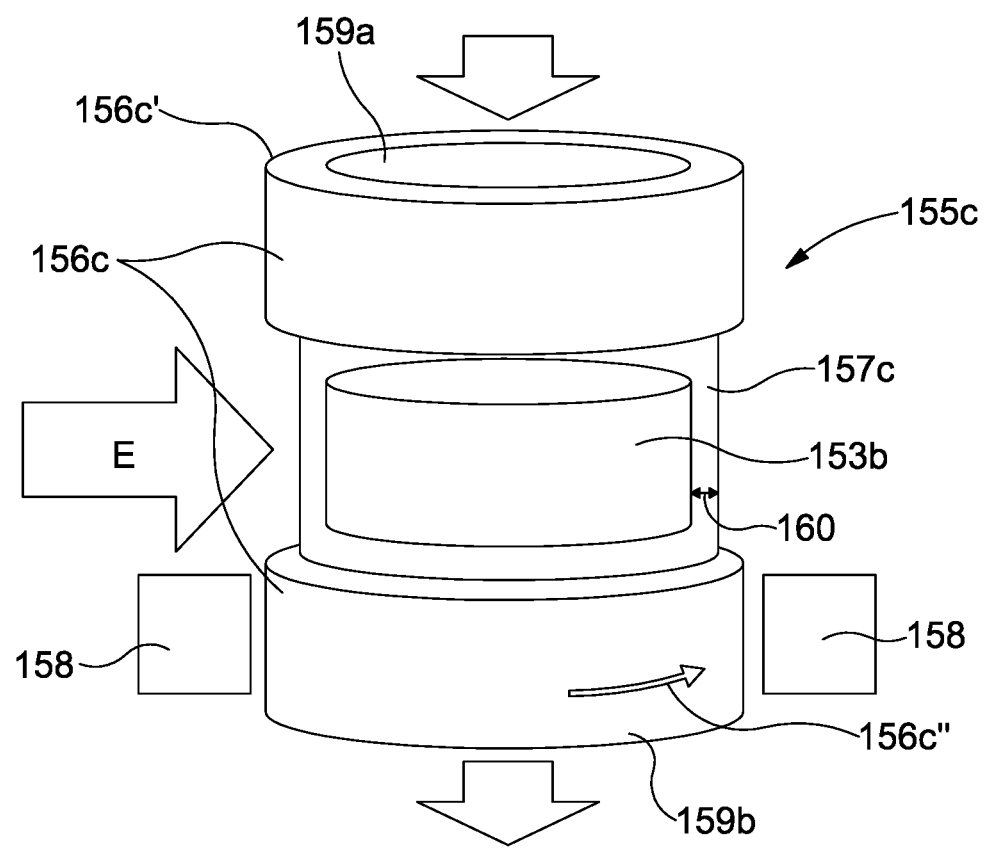
FIG. 13c is a schematic illustration of a target arrangement for a radioisotope production apparatus comprising a moveable housing, window and target.

FIGS. 13a to 13c show exemplary target arrangements 155a, 155b, 155c, which each include a housing 156a, 156b, 156c and a window 157a, 157b, 157c for transmission of the electron beam E into the housing 156a, 156b, 156c.

In the exemplary target arrangements shown in FIGS. 13a and 13b, the target 153b and/or target support 154b may be arranged in the housing 156a, 156b to move or rotate the target 153b relative to the housing 156a, 156b and the window 157a, 157b. For example, as shown in FIG. 13b, an actuator, which may be provided in the form of a motor 158, may be coupled or connected to the target support 154b. The window 156a may be considered as being fixed or stationary relative to the target 153b. This arrangement may allow the target 153b to be subjected to the electron beam E from one side only, while the activation of the target 153b, e.g. of all target plates, may be the same or uniform. In use, the housing 155a may be subjected to a higher dose of the electron beam compared to the target 153b. Although the window 156a is shown in FIGS. 13a and 13b as having a rectangular shape, it will be appreciated that in other embodiments the shape of the window may be different. For example, the window may be provided in the form of a slit or may have a squared shape. The target support 154b shown in FIG. 13b may be the same or at least similar to that shown in FIG. 12b. It will be appreciated that in the embodiment shown in FIG. 13a the target support (not shown) may be provided in or by the housing 156a.

In the exemplary target arrangement 155c shown in FIG. 13c, the window 157b is arranged to surround the target 153b. By arranging the window 157b to surround the target 153b, the target 153b may be exposed to the electron beam E from more than one side. For example, the target 153b may be exposed to the electron beam E from two sides, e.g. two opposing sides, or from three or more sides. In the embodiment shown in FIG. 13c, the housing 156c comprises an upper portion 156c' and a lower portion 156c". The window 157c may be arranged between the upper and lower portions 156c', 156c" of the housing 156c.

In the embodiment shown in FIG. 13c, the target support (not shown) is configured to move or rotate housing 156c and/or the window 157c with the target 153b. The housing 156c may be part of the target support and may be configured to rotate or move the window 157c and target 153b relative to the electron beam E. This may lead to a reduced heat load on the window 157c and may allow uniform activation of the target 153b. In the exemplary target arrangement 155c shown in FIG. 13c, the housing 156c, e.g. the lower portion 156c" of the housing 156c is coupled or connected to a motor 158 for moving or rotating the housing 156c, window 157c and target 153b.

Referring to FIGS. 13b and 13c, the target arrangement 155b, 155c may comprise an inlet 159a for supplying the coolant to the target 153b and an outlet 159b for discharging coolant from the target 153b. The inlet 159a and outlet 159b may be part of the housing 156b, 156c. The coolant, which may be in the form of helium coolant, may also be provided to cool the window 157b, 157c. This may be facilitated by a space or gap 160 between the window 157b, 157c and the target 153b.

Figure 14A:
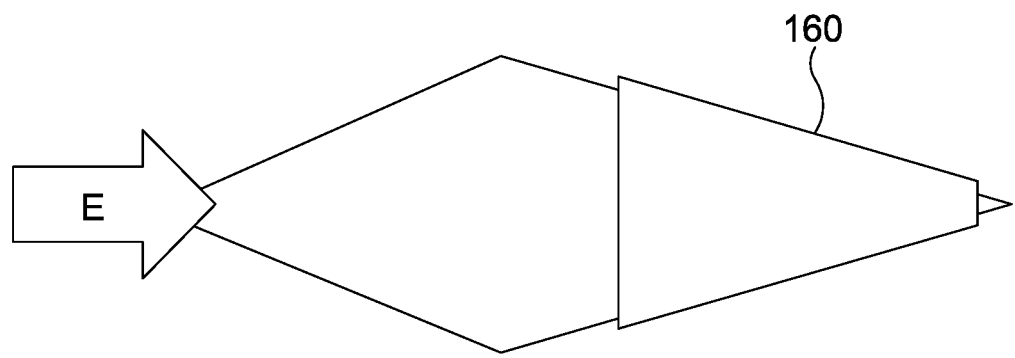
FIGS. 14a and 14b are schematic illustrations of an electron target arrangements for a radioisotope production apparatus comprising an electron beam focusing arrangement.
Figure 14B:
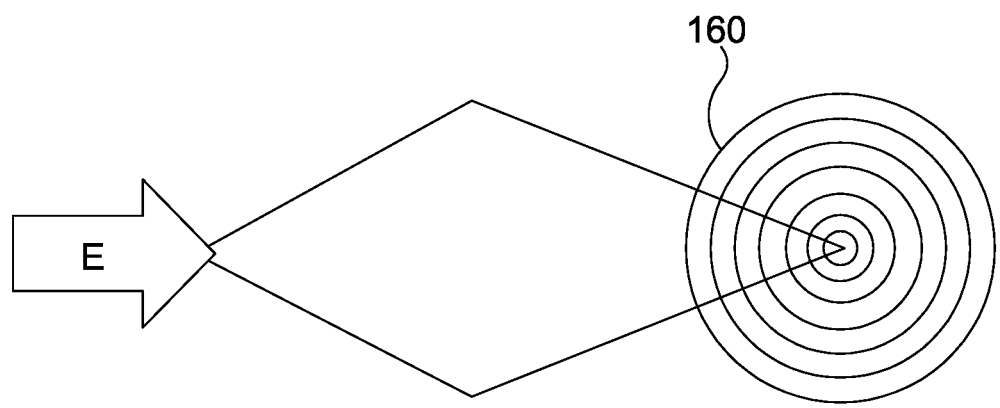

FIGS. 14a and 14b schematically depict an exemplary radioisotope production apparatus, which may comprise an electron beam focusing arrangement (not shown) configured to focus the electron beam E on the target 160. The target 160 may comprise any one of the targets described above and/or may be held by any one of the target supports described above. The electron beam focusing arrangement may comprise a lens (not shown), which may, for example, be formed from magnets, and may be a multipole (e.g. quadrupoles, hexapoles, octupoles) lens. In this embodiment, the target 160 may be arranged to be fixed or stationary relative to the electron beam E. It will be appreciated that in other embodiments, the target may be moved or rotated relative to the electron beam, for example, as described above. By focusing the electron beam onto the target, a uniform heat load on the target may be achieved.

Figure 15A:
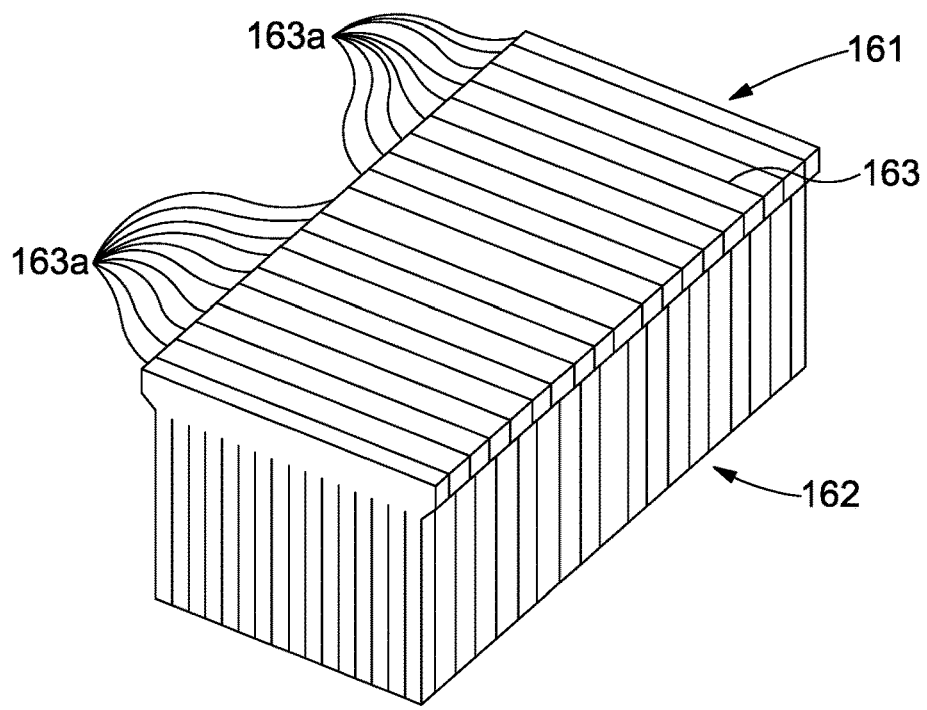
FIGS. 15a to 15c a schematic illustration of a target for a radioisotope production apparatus.
Figure 15B:
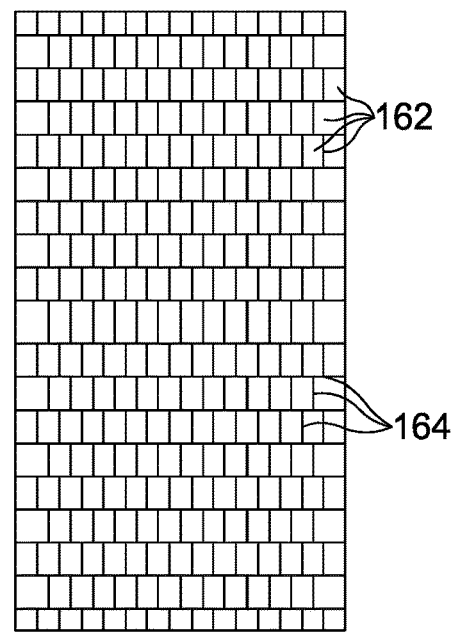
Figure 15C:
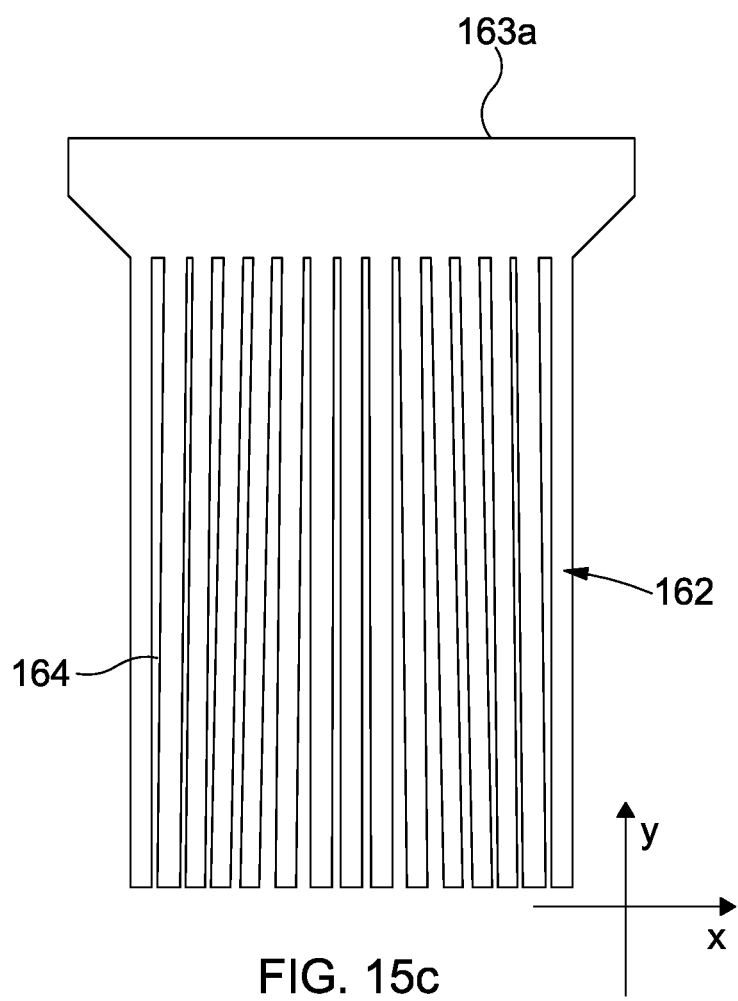

FIGS. 15a to 15c show another exemplary target arrangement 161 for use with a radioisotope production apparatus. The target arrangement 161 comprises a plurality of spaced target elements 162 and a target support 163. The target support 163 may be configured to suspend a part of the plurality of target elements 162 to allow expansion of the part of target elements 162 in at least one direction. It will be appreciated that in other embodiments the target support may be configured to suspend all of the plurality of target elements.

The target support 163 may comprise a plurality of support elements 163a, which may be arranged in series. Each support element 163a may be configured to suspend a portion of the target elements 162, as shown in FIG. 15c. This may allow parts, e.g. one or more support elements 163a, of the target 161 to be removed for recovery of converted target material, e.g. radioisotope material. Each support element 163a and associated target elements 162 may define a comb-like or toothcomb-like shape or structure, as shown in FIG. 15c. The target elements 162 may be considered as extending from the target support 163, e.g. from each support element 163, and/or may be considered as each comprising a free end. By configuring the target support 163 (or each/the target support element(s) 163a) to suspend at least a part of the target elements 162, expansion of the target elements in a substantially longitudinal direction, which is indicated as a y-direction in FIG. 15c, of the target arrangement 161 may allowed. This may prevent built-up of thermal stresses in the target arrangement 161, which in turn, may allow an increase of the current and/or current density of the electron beam and may lead to an increased conversion of the target into radioisotope material.

FIG. 15b schematically depicts a bottom view of the arrangement of the target elements 162 on the target support 163. As can be seen in FIG. 15b, the target elements 162 are arranged to be staggered in at least one direction. The target elements 162 may be staggered such that the electrons of the electron beam are prevented from travelling unimpeded from one side of the target 161 to another side of the target 161. This may allow an increased radioisotope production. In at least one other direction, the target elements 162 may be arranged to be in line with each other.

The target arrangement may be configured such that some of the target elements are of the same size and as least some other target element are of different sizes. For example, the target elements 162 of some target support element 163a may be of the same size, while the target elements 162 of other target support elements 163 are of different sizes, e.g. widths or lengths. This arrangement of target elements 162 may provide the staggered arrangement.

FIG. 15c schematically depicts a single target support element 163a comprising associated target elements 162. A space or gap 164 may be provided between adjacent target elements 162. The coolant may be flow in the space or gap 164 between adjacent target elements 162. The space or gap 164, e.g. a size of the space or gap, is selected to allow for dilation or expansion of the target elements 162 in at least one other direction. For example, the size or gap may be selected to allow for dilation or expansion of the target elements 162 in one or more substantially transverse direction(s). For example, one of the transverse directions may be along the x-direction depicted in FIG. 15c and another of the transverse directions may be substantially perpendicular to the x- and y-directions depicted in FIG. 15c. A size of space or gap between adjacent target elements may be about 0.1 mm. For example, when a helium coolant pressure is increased from 60 bar (6000 kPa) to 100 bar (10000 kPa) the maximum temperature of the target arrangement 161 may decrease to below 800° C., which is below, for example, the recrystallization temperature of Molybdenum. At temperatures below 800° C. the expansion or deformation of the target elements 162 may be considered to be small and the target elements 162 may not contact each other, when the target arrangement 161 is subjected to heat caused by the electron beam. It will be appreciated that the size of the space or gap between adjacent target elements may be selected depending on a pressure of coolant supplied to the target.

The target arrangement 161 may be manufactured by a 3-D printing technique, such as selective laser melting (SLM). The size of the target element 162 and/or the space 164 between adjacent target elements 162 may be determined by manufacturing restrictions.

FIGS. 15a to 15c show all of the target elements 162 as being suspended from the target support. It will be appreciated that in other embodiments a part of the target element may be supported. For example, the target support may comprise a first portion for suspending one part of the target elements and a second portion for supporting a free end of another part of the target elements. The second portion may be arranged to support the target elements on one or two opposing sides of the target arrangement.

Each of the targets described in FIGS. 11a to 15c may comprise a Mo-100 target. However, it should be understood that the invention is not restricted to such target material and that in other embodiments other target materials may be used, for example, as described below.

Figure 16A:
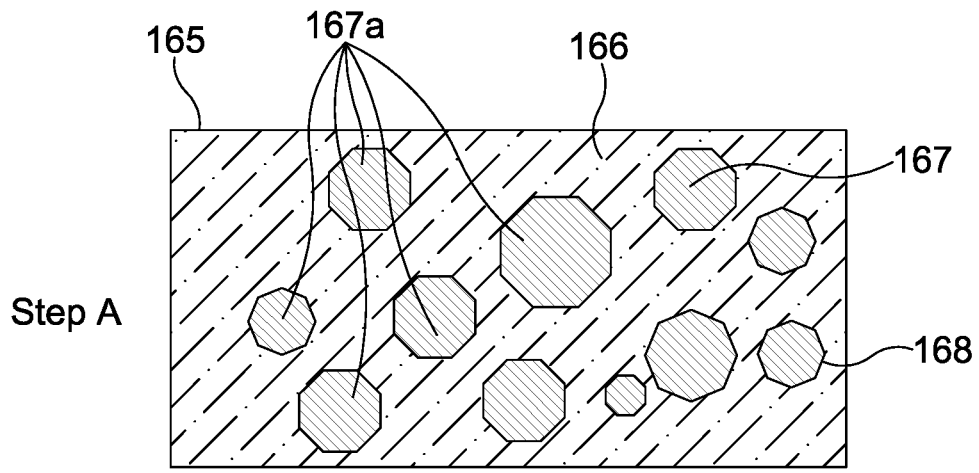
FIGS. 16a to 16e are schematic illustrations of the process steps of a method for producing a radioisotope.

FIGS. 16a to 16e schematically depicts the flow of an exemplary method for producing a radioisotope. FIG. 16a schematically depicts another exemplary target for use with a radioisotope production apparatus. The exemplary target 165 shown in FIG. 16a comprises a first material 166, which comprises a substrate material (not shown) for conversion into a radioisotope material and a second material 167. The second material 167 is configured to retain converted substrate material. The second material 167 is arranged or arrangeable in the first material 166 to form the target 165. For example, the second material 167 may be mixed into or interspersed in the first material 166. However, the first and second material may remain distinct materials. It will be appreciated that in other embodiments, the first material may be arranged in the second material.

The first and second materials 166, 167 may comprise different materials, e.g. chemically different substances. A transition between the first material 166 and the second material 167 may define a boundary 168. The first material 166 and the second material 167 may be distinct materials and/or may be separated by the boundary 168.

Figure 16B:
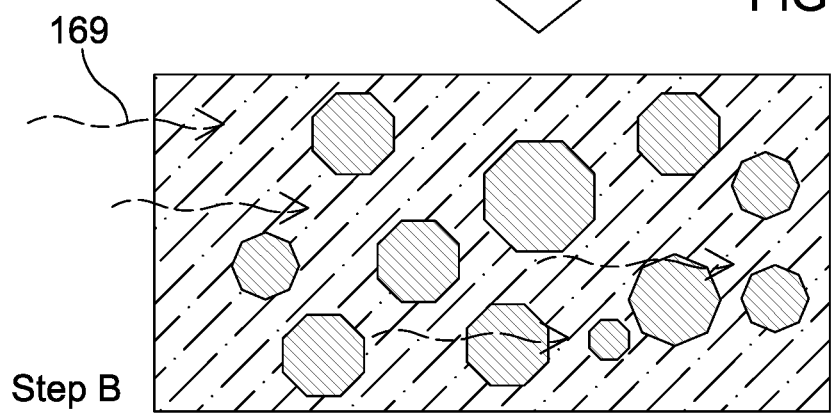
Figure 16C:
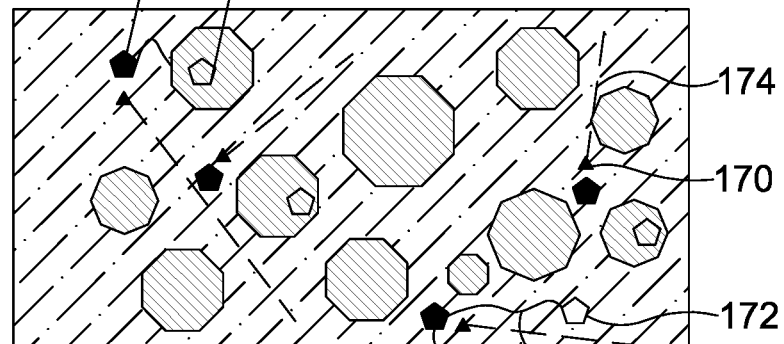

The method comprises arranging the target 165 in the radioisotope production apparatus (step A). The method comprises irradiating the target 165 with an electron beam E (not shown) (step B). The electron beam E is configured to cause conversion of a part of the substrate material into radioisotope material. The electron beam E is configured to cause displacement of some of the converted source material into the second material 167. As described above, when electrons in the electron beam E are incident on the target 165, photons are emitted. The photons 169 emitted by the target 165 are schematically depicted in FIG. 16b as wavy arrows. When a photon is incident on a nucleus of the substrate material, it causes a photonuclear reaction via which a neutron is ejected from the nucleus. For example, the photon 169 is absorbed by the nucleus of the substrate material. This causes the nucleus of the substrate material to become excited. The excited nucleus returns to its ground-state or becomes de-excited by emission of the neutron 170. The nucleus of the substrate material is thereby converted to a radioisotope nucleus 171. In some embodiments, the de-excitation or return to the ground state of the nucleus may result in fission of an atom of the substrate material. When the photon 169 is incident on the nucleus, some or all of the momentum of the photon may be transferred on the nucleus. This may be referred to as nuclear recoil and may result in the nucleus and/or ejected neutron to be become displaced, for example, in the first material and/or into the second material 167. In other words, the nuclear recoil may cause a nucleus to become implanted into the second material 167. For example, a photon that causes the above described photonuclear reaction may have an energy between 10 MeV and 50 MeV. As described above, the energy of the photon may be dependent on the energy of the electrons in electron beam. The momentum p=E/c of the photon may be completely absorbed by the nucleus on which the photon is incident. Due to the conservation of momentum the nucleus, which may have an atomic mass unit (AMU) of about 100, may receive kinetic energy $$E_{nucl} = \frac{p^2}{2M_{nucl}},$$

which may be between 0.5 keV and 15 keV, whereby $M_{nucl}$ is the mass of the nucleus. Some of the transferred momentum may remain with the nucleus after de-excitation by emission of the neutron. The neutron emitted from the excited nucleus may have a kinetic energy of $E_n \approx 1$ Mev. Due to the conservation of momentum, the nucleus may have a recoil kinetic energy of:

$$E_{nucl(1)} = E_n * \frac{M_n}{M_{nucl}} \cong 10\,\text{keV},$$

whereby $M_n$ is the mass of the neutron. A nucleus with a kinetic energy of 10 keV may be displaced in the target by about 10 nm. This displacement or distance is indicated in FIG. 16c by L. The second material 167 may comprise a plurality of particles 167a. Each particle 167a of the second material 167 may have a size or dimension, e.g. a diameter, of less than 1 µm. For example, each particle 167a of the second material 167 may have a size or dimension of about 10 nm. This may allow the radioisotope nucleus 170 to become displaced from the substrate material into the second material 167, e.g. the particles 167a thereof. It will be appreciated that in other embodiments the first material may comprise a plurality of particles, which may each have a size or dimension, e.g. a diameter, of less than 1 µm, e.g. about 1 nm. Alternatively, both the first and second materials may comprise particles, which may have a size or dimension of less than 1 µm, e.g. about 10 nm. The displaced radioisotope nucleus 170 is indicated in FIG. 16c by reference numeral 172 and the displacement is indicated curved lines 173. FIG. 16c shows that the emitted neutron 170 has been displaced into particles 167a of the second material 167. The trajectory of the emitted neutron 171 in the first material 166 is indicated in FIG. 16c by straight lines 174. It will be appreciated that the interaction between the emitted neutron 171 and the first material 166 may be weak.

Figure 16D:
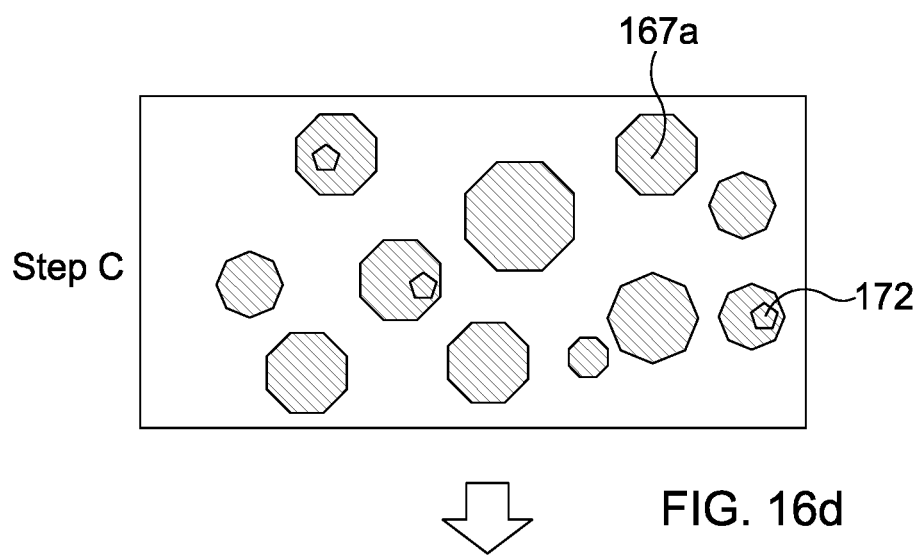
Figure 16E:
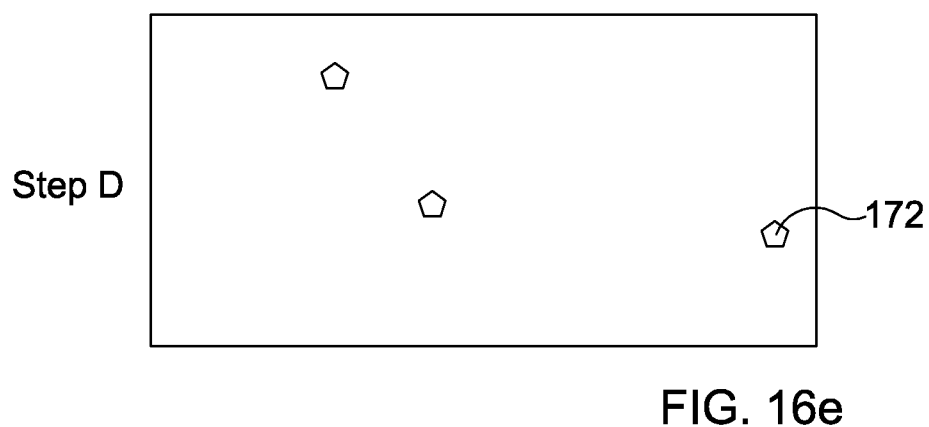

The method comprises separating at least part of the converted substrate material, e.g. the radioisotope nucleus 172 or the radioisotope material, from the second material 167 (Step C). This step may include separating the first material 166 from the second material 167, prior to separating the converted substrate material from the second material 167. The first material 166 may be separated or removed from the second material 167, for example, by chemical or physical evaporation or melting of the first material 166. FIG. 16d shows the remaining particles 167a of the second material and the displaced or implanted converted substrate material, e.g. the radioisotope nuclei 172. Subsequently to Step C, the converted material, e.g. the radioisotope nuclei 172 or radioisotope, may be separated from the second material 167 (Step D), as shown in FIG. 16e. For example, the second material 167 may be etched so that only the radioisotope material remains.

The second material 167 may comprise a material that is chemically inert or at least stable. This may facilitate arranging of the first material in the second material. The second material may comprise a material that may be produced in bulk at low costs. Exemplary materials that may be used as the second material comprise at least one of graphene particles or flakes, carbon particles or nanostructures, e.g. nanotubes, metal particles or nanostructure, e.g. metal nanowires, colloid or colloid solution, e.g. a colloid solution of particles or nanoparticles, e.g. a zeolite matrix, and alumina (e.g. aluminum oxide ($Al_2O_3$)) particles or nanostructure, e.g. alumina nanofibers. For example, the alumina nanofibers may have a diameter of about 10 nm to 15 nm and may be producible at any length, such as 10 cm or more.

The exemplary alumina nanofibers may comprise crystalline gamma-phase alumina fibers, which may have a surface area of about 155 m$^2$/g, a tensile strength of 12 GPa, a tensile modulus of 400 GPa, a faceted surface with vacant aluminum bonds, a bulk density of 0.1-0.4 g/cm$^3$, a thermal conductivity of about 30 W/mK and/or may maintain gamma phase stability in temperatures up to 1200° C. The exemplary alumina nanofibers may be configured to allow unidirectional fiber alignment, dispersion in resins and/or liquids and/or to be fire resistant. The exemplary alumina fibers may comprise NAFEN alumina fibers.

An exemplary target 165 may be configured for the production of Dysprosium-157 (Dy-157), which has a half-life of 8 hours, from Dysprosium-158 (Dy-158), which may be considered as stable. Dy-157 may, for example, find utility in medical diagnostic methods, such as single photon emission computer tomography (SPECT). The target may be produced by mixing or arranging a salt of Dysprosium (e.g. DyCl$_3$) with alumina nanofibers. The salt may occupy about 90% of the volume and the alumina nanofibers may occupy about 10% of the volume. A distance between the alumina nanofibers, e.g. parallel alumina nanofibers, may range from about 20 nm to about 50 nm. As described above, the target 165 may be irradiated with an electron beam and emitted photons may be absorbed by the target.

Figure 17A:
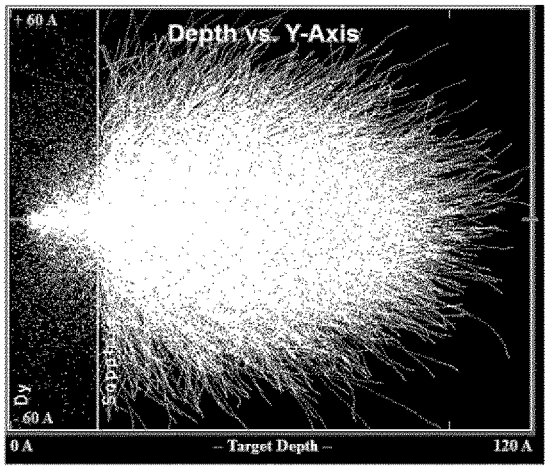
FIG. 17a is a chart illustrating converted substrate material implantation into a second material.
Figure 17B:
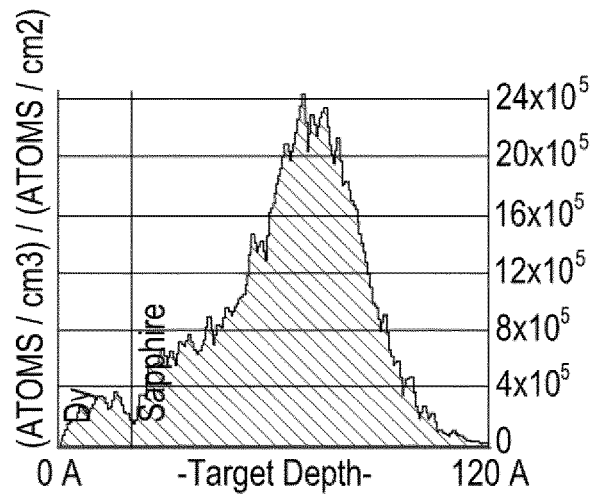
FIG. 17b is a chart illustrating a distribution of converted material in a second material.
Figure 17C:
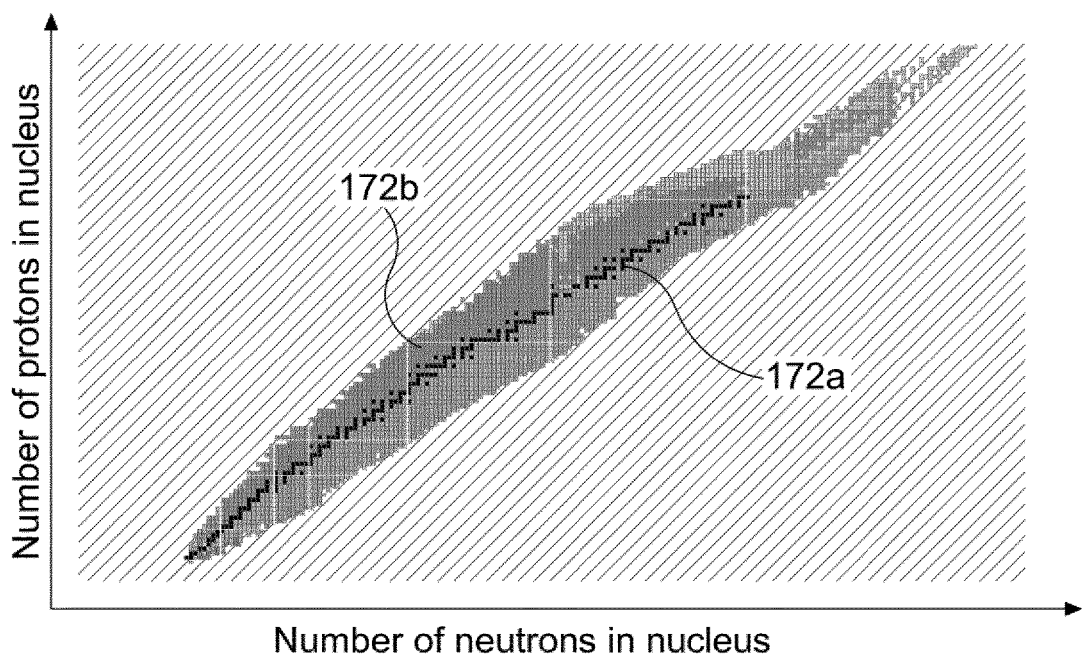
FIG. 17c is a nuclides chart illustrating an isotope distribution.

FIG. 17a illustrates the trajectories of Dysprosium ions having an energy of 10 keV in a solid. The Dysprosium is displaced or implanted by about 2 nm into layers of Dysprosium and by about 10 nm into the alumina nanofibers (which is referred to as "sapphire" in FIGS. 17a and 17b). FIG. 17b illustrates the distribution of the Dysprosium ions in the Dysprosium and the alumina nanofibers. From FIG. 17b it can be seen that the maximum of the Dysprosium ion distribution lies in the nanofibers. FIG. 17c illustrates a chart of nuclides, whereby the x-axis indicates the number of neutrons in a nucleus and the y-axis indicates the number of protons in a nucleus. From this chart can be seen that a large number of Dy-157 radioisotope were produced. Stable isotopes are indicated by reference numeral 172a in FIG. 17c. Radioisotopes that are deficient of neutrons correspond to isotopes that decay via positron emission or electron capture are indicated by reference numeral 172b in FIG. 17c. Subsequent to the irradiation of the target 165 with the electron beam, the salt may be removed and the alumina nanofibers may be etched, e.g. by using base solution, such as potassium hydroxide (KOH) or sodium hydroxide (NaOH) solution. Once the alumina nanofibers have been etched, the Dy-157 radioisotopes may be extracted from the solution.

Another exemplary target 165 may be configured for the production of Radium-224 (Ra-224), which is an alpha-emitter and has a half-life of 3.7 days, from Radium-226 (Ra-226, which has a half-life of 1600 years. Ra-224 may, for example, find utility in medical diagnostic methods, such as targeted therapy of cancerous tissue or tumors. The method described above may be used to produce Ra-224 from Ra-226 and to separate the Ra-224 isotopes from the carrier material. A by-product of the reaction ($\gamma$, 2n) may be Radium-225 (Ra-225), which may be produced in large amounts and may be used for SPECT imaging. By irradiating the target with the electron beam, as described above, the amount of fission products may be reduced compared to the production of Ra-224 by proton beam irradiation.

Another exemplary target 165 may be configured for the production of Ra-224 from Thorium-228 (Th-228), which has a half-life of 2 years. A first material comprising Thorium-232 (Th-232) may be mixed with alumina nanofibers to form the target. The target may be irradiated by the electron beam. The irradiation of the first material may be repeated. As described above, due to the photonuclear reaction ($\gamma$, 4n) of the Th-232 with the photons, Th-230, Th-229, Th-228 and Protactinium-231 (Pa-231) may be produced. By repeating the irradiation of the target with the electron beam, Ra-224 may be produced from Th-228. The Ra-224 isotopes may then be separated from the alumina nanofibers, as described above. This may allow the Ra-224 to be separated from Thorium by using a reduced amount of chemicals, than that needed in other methods.

Another exemplary target may be configured for the production of Nickel-63 from Nickel-64, which may be stable. Ni-63 may, for example, find utility in electric high-power supply devices, such as beta-decay driven (beta voltaic) batteries for embedded electronics. The provision of Ni-63 may allow the manufacture of miniaturized power supply devices, which may have a 100 year lifetime. The first material comprising Ni-64 may be mixed with second material to form the target. The target may be irradiated with the electron beam and due to the photonuclear reaction ($\gamma$, n) of the Ni-64 with the photons, Ni-63 may be produced. As described above, the Ni-63 may be separated from the carrier material. The exemplary method disclosed herein may be considered as an alternative method for the production of Ni-63, which may not rely on the use of reactors, such as high-flux neutron reactors or the like. Alternatively or additionally, the yield of Ni-63 may be increased compared to the yield of Ni-63 from a reactor.

Although the above exemplary method for producing a radioisotope has been described as comprising the irradiation of the target with an electron beam, it will be appreciated that in other embodiments, the target may be irradiated with a proton, deuteron or ion beam. The irradiation of the target with such beam may cause an increased displacement of the radioisotopes in the second material. However, some atoms of the source material may be displaced into the second material without a photonuclear reaction taking place.

Although in the above described exemplary method a neutron was ejected from the nucleus, as a result of the photonuclear reaction, it will be appreciated that in other embodiments, a different photonuclear reaction may cause ejection of a proton or alpha-particle from the nucleus. In some embodiments, the different photonuclear reaction may result in fission products. It should be understood that the above described method may be used for the production of a nucleus or fission product resulting from the different photonuclear reaction.

Figure 18:
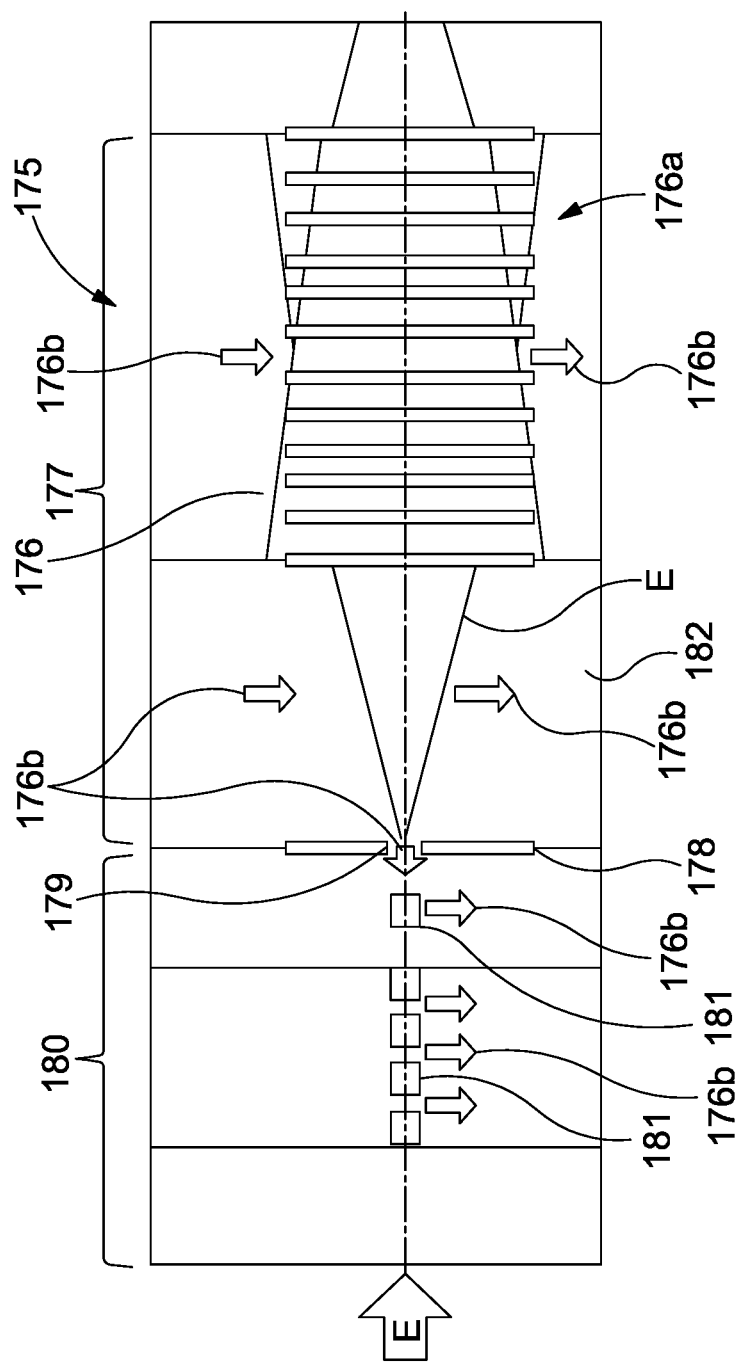
FIG. 18 is a schematic illustration of a target arrangement comprising a separation element, which comprises an aperture.
Figure 19:
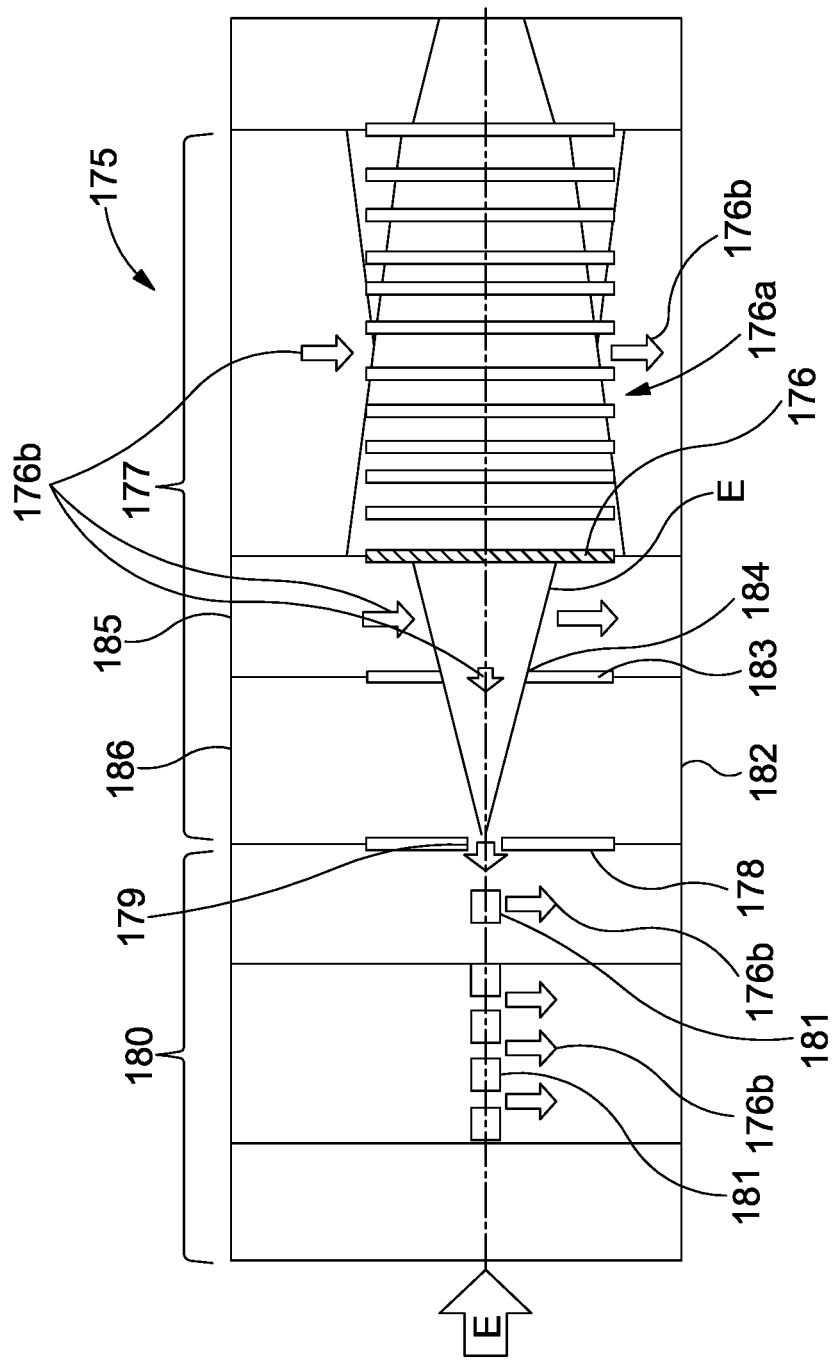
FIG. 19 is a schematic illustration of a target arrangement comprising a shielding element, which comprises an aperture.
Figure 21:
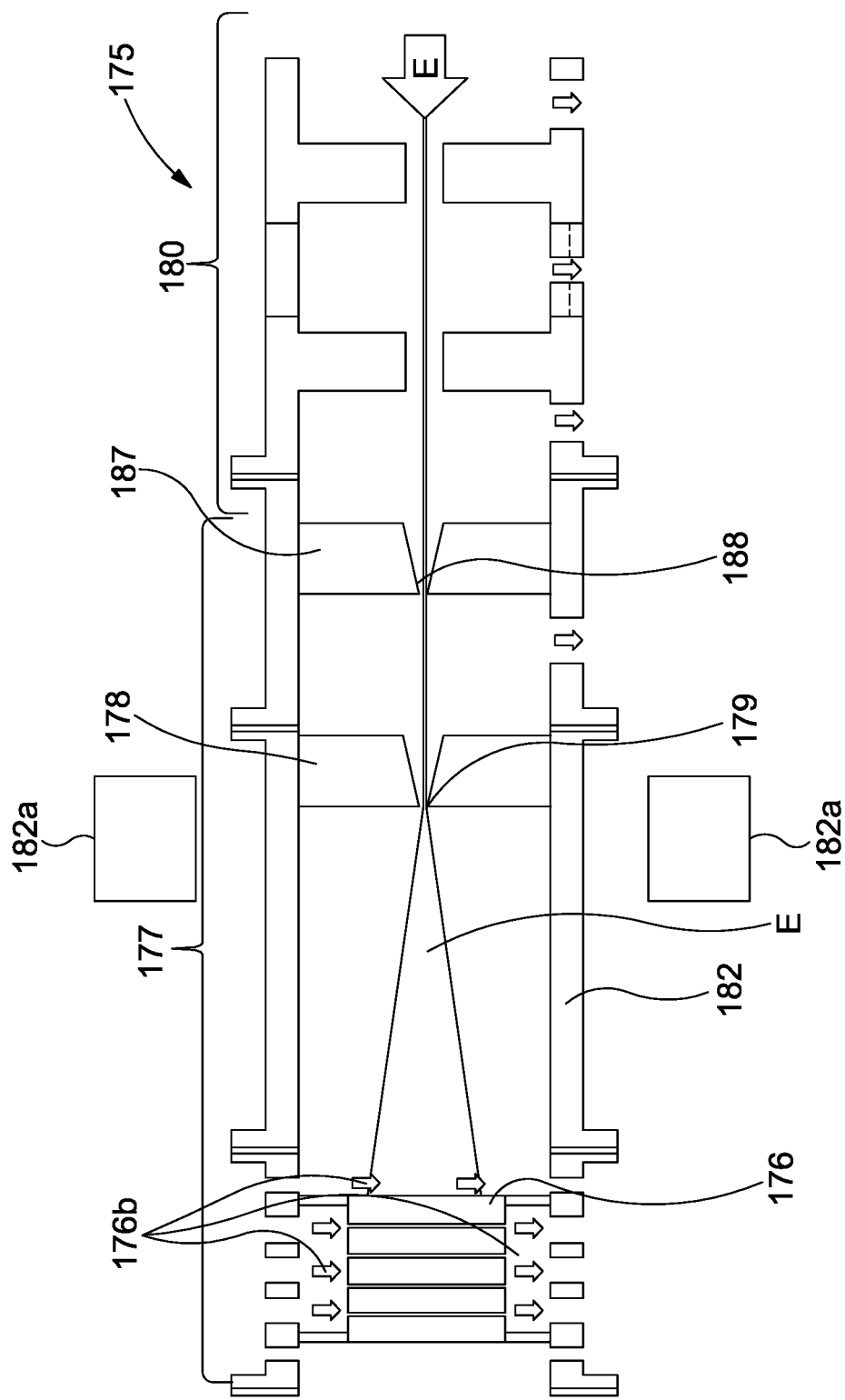
FIG. 21 is a schematic illustration of a target arrangement comprising a further separation element, which comprises a further aperture.

FIGS. 18, 19 and 21 schematically depict another target arrangement 175, which may be used with a radioisotope production apparatus. The target arrangement comprises a target 176, which may comprise a plurality of target plates 176a. The target 176 is held by a support structure (not shown). The target 176 is mounted in a chamber 177. The chamber 177 comprises a separation element 178, which separates the chamber 177 from the electron injector and electron source (not shown). The separation element 178 may define a portion, e.g. a side wall, of the chamber 177. The separation element 178 comprises an aperture 179 through which the electron beam E can enter the chamber 177. By allowing the electron beam to enter the chamber through the aperture in the separation element, the heat load, which may be caused by the electron beam, on the separation element may be reduced. This may lead to an increased lifetime of the separation element. The target arrangements shown in FIGS. 18, 19 and 21 may be considered as "window-less" target arrangements. The described separation element may be considered as replacing a window that may be used to isolate the target from the electron beam environment.

The separation element 178 may be provided with the aperture 179 to reduce a pressure differential between the target 176 and the electron beam environment 180, e.g. the electron injector (not shown) and/or the electron accelerator (not shown) or respective portions thereof. As described above, the target 176 may be cooled, for example, with a gas coolant. In the example shown in FIGS. 18, 19 and 21, the target 176 is cooled by a flow of helium (He) 176b. For example, helium coolant 176b may be supplied to the target 176 at a pressure of about 75 bar (7500 kPa). The separation element 178 may be arranged in the chamber 177 such as to allow flow of the helium coolant 176b through the aperture 179 into electron beam environment 180. This may lead to an increase of the pressure in the electron beam environment 180. For example, the pressure of the electron beam environment 180 may range from vacuum to 1 bar of helium. The flow of helium coolant 176b through the aperture 179 may allow a pressure differential between the target 176 or the chamber 177 and the electron beam environment 180 to be decreased. This may prevent damages to the separation element, e.g. rupture of the separation element 178, due to the pressure differential between the target or chamber 177 and the electron beam environment 180. Consequently, the risk of contamination to the electron beam environment due to rupture of the separation element may be reduced. One or more pumping or suction device(s) 181, e.g. one or more differential pump(s) and/or a booster pump, may be provided to minimize the pressure in the electron beam environment.

The chamber 177 may comprise an electron beam steering section 182, which may be arranged between the separation element 178 and the target 176. In the electron beam steering section 182 the electron beam may be defocused to enlarge the beam to a desired dimension for irradiation of the target 176, for example, by using a lens formed from magnets 182a, as shown in FIG. 21. The helium coolant 176b may be supplied to the electron beam steering section 182 at a pressure of 70 bar (7000 kPa). This may lead to a reduction of the energy of the electron beam due to electrons of the electron beam colliding with helium atoms. For an electron beam having an energy of about 60 MeV, the reduction of the energy of the electron beam may be about 3 MeV at a helium pressure of about 70 bar (7000 kPa). This reduction in energy may be considered to be acceptable. Due to the helium pressure in the beam steering section cooling of the chamber 177 and/or the target 176 may be provided.

The size or diameter of the aperture 179 in the separation element may be selected dependent on a size, e.g. collimation, of the electron beam E. For example, the size of the electron beam may be below 0.1 mm, in which case the size or diameter of the aperture may be about 1 mm. For a helium pressure of, for example, 70 bar (7000 kPa) in the electron beam steering section 182, this size may result in a flow rate of the helium coolant 176b through the aperture 179 of about 0.005 kg/s. If the size of the aperture 179 is increased to 2 mm, then the helium coolant flow rate through the aperture may be about 0.02 kg/s. The aperture 179 may be considered as a critical flow restriction.

In the exemplary target arrangement 175 shown in FIG. 19, the chamber 177 may additionally comprise a shielding element, which may be provided in the form of a shielding plate 183. The shielding plate 183 may comprise an aperture 184 through which the electron beam E passes to the target 176. The shielding plate 183 may be arranged between the separation element 178 and the target 176. The aperture 184 of the shielding plate may be larger than the aperture 179 of the separation element 178. For example, the aperture 184 of the shielding plate 183 may have a size or diameter of about 20 mm. Due to the aperture 179 in the separation element 178, a pressure differential may act across the target 176, e.g. a first plate 176a of the target 176. The first plate of the target 176 may be arranged to be proximal to the separation element 178. By arranging the shielding plate 183 in the chamber 177, the pressure differential acting on the target 176, e.g. the first plate of the target 176, may be reduced. The shielding plate 183 may be arranged to balance the helium coolant 176b flow from the target 176 to the electron beam environment 180 through the aperture 179 of the separation plate 178. The chamber 177 may comprise a portion 185, which extends between the shielding plate 183 and the target 176. The portion 185 of the chamber may be supplied with helium coolant 176b, for example, at the same pressure as the helium pressure supplied to the target 176. By supplying the portion 185 of the chamber 177 with helium coolant 176b at the same pressure as the helium pressure supplied to the target, cooling of the target 176 may be increased.

Figure 20A:
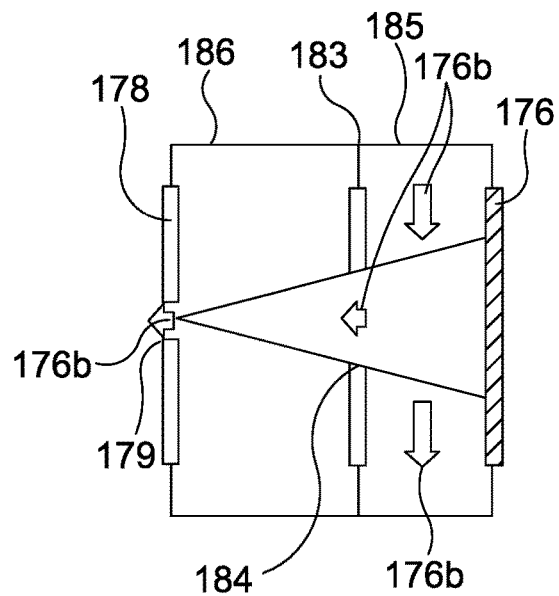
FIGS. 20a to 20c are schematic illustrations of coolant flow supply and extraction in parts of the target arrangement of FIG. 18b.
Figure 20B:
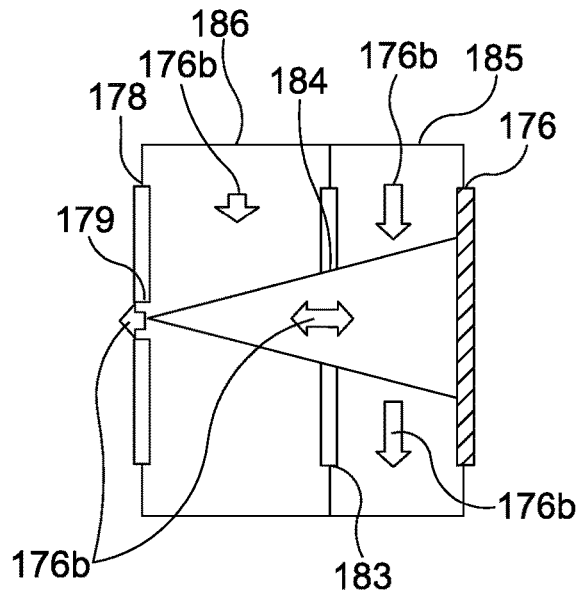
Figure 20C:
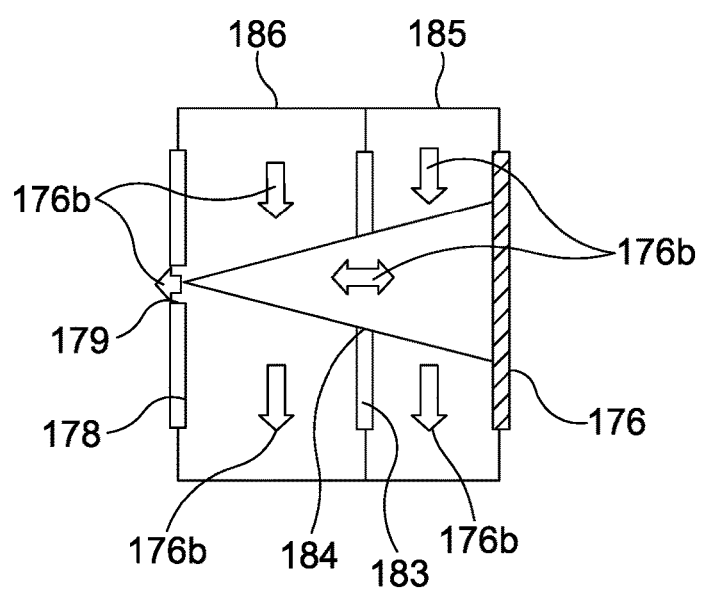

FIGS. 20a to 20c schematically depict the helium coolant 176b flow in the chamber 177 between the separation element 178 and the shielding plate 183 and between the shielding plate 183 and the target 176. The helium coolant 176b flow between the separation element 178 and the shielding plate 183 and/or between the shielding plate 183 and the target 176 may be adjusted to create a pressure profile in the portion 185 of the chamber 177, which may be similar to a pressure profile at the target 176.

The radioisotope production apparatus may comprise a cooling apparatus (not shown). The cooling apparatus may be configured to provide the helium coolant 176b to the target 176 and/or chamber 177, as described above. In the example of FIG. 20a, the cooling apparatus may be configured to provide the helium coolant 176b to the portion 185 of the chamber 177 and/or to extract the helium coolant 176b from the portion 185. The cooling apparatus may be configured to supply the portion 185 with helium coolant 176b at a pressure of 75 bar (7500 kPa). Helium coolant extracted from the target 176 and/or the port ion 185, for example, by the cooling apparatus may have a pressure of about 65 bar (6500 kPa).

In the example of FIG. 20b, the cooling apparatus may be configured to additionally supply helium coolant 176b to a further portion 186 of the chamber 177. The further portion may extend between the separation element 178 and the shielding plate 183. The cooling apparatus may supply the further portion 186 with helium coolant 176b, for example, at a pressure of 70 bar (7000 kPa). The further portion may be part of or comprised in the electron beam steering section 182 or a part thereof.

In the example of FIG. 20c, the cooling apparatus may be configured to additionally supply helium coolant 176b to a further portion 186 of the chamber 177 and to extract the helium coolant 176b from the further portion 186.

FIG. 21 schematically depicts another example of the target arrangement 175. The target arrangement depicted in FIG. 21 is similar to that depicted in FIG. 18. However, in the example depicted in FIG. 21, the chamber 177 comprises a further separation element 187. The further separation element 187 may comprise a further aperture 188. The further aperture 188 of the further separation element 187 may be of the same size or of a different size than the aperture 179 of the separation element 178. By arranging a further separation element comprising a further aperture, the helium coolant 176b flow to the electron beam environment 180 may be reduced.

In an embodiment, a system comprising a free electron laser and a radioisotope production apparatus may be configured to provide an electron beam with a current of 10 mA or more. The current provided by the system may, for example, be 20 mA or more or may be 30 mA or more. The current may, for example, be up to 100 mA or more. An electron beam with a high current (e.g. 10 mA or more) is advantageous because it increases the specific activity of the radioisotope produced by the radioisotope production apparatus.

As explained further above, Mo-100 may be converted to Mo-99 (a desired radioisotope) using very hard X-ray photons generated by an electron beam hitting an electron target. The half life of Mo-99 is 66 hours. As a consequence of this half-life there is a limit to the specific activity of Mo-99 which can be provided when starting with Mo-100, the limit being determined by the rate at which Mo-99 is generated. If the Mo-99 is generated at a relatively low rate, for example using an electron beam current of around 1-3 mA, then it may not be possible to provide a specific activity of more than around 40 Ci/g of Mo-99 in the target. This is because although the irradiation time may be increased in order to allow generation of more Mo-99 atoms, a significant proportion of those atoms will decay during the irradiation time. The threshold of specific activity of Mo-99 used in medical applications in Europe should be 100 Ci/g, and thus Mo-99 with a specific activity of 40 Ci/g or less is not useful.

When a higher electron beam current is used the rate at which Mo-99 atoms are generated is increased accordingly (assuming that the volume of Mo-99 which receives photons remains the same). Thus, for example, for a given volume of Mo-99, an electron beam current of 10 mA will generate Mo-99 at 10 times the rate of generation provided by an electron beam current of 1 mA. The electron beam current used by embodiments of the invention may be sufficiently high that a specific activity of Mo-99 in excess of 100 Ci/g is achieved. For example, an embodiment of the invention may provide an electron beam with a beam current of around 30 mA. Simulations indicate that, for a beam current of around 30 mA, if the electron beam has an energy of around 35 MeV and the volume of the Mo-100 target is around 5000 $mm^3$ then a specific activity of Mo-99 in excess of 100 Ci/g can be obtained. The Mo-100 target may for example comprise 20 plates with a diameter of around 25 mm and a thickness of around 0.5 mm. Other numbers of plates, which may have non-circular shapes and may have other thicknesses, may be used.

As noted further above, an electron injector of an embodiment of the invention may be a photo-cathode which is illuminated by a pulsed laser beam. The laser may, for example, comprise a Nd:YAG laser together with associated optical amplifiers. The laser may be configured to generate picosecond laser pulses. The current of the electron beam may be adjusted by adjusting the power of the pulsed laser beam. For example, increasing the power of the pulsed laser beam will increase the number of electrons emitted from the photo-cathode and thereby increase the electron beam current.

The electron beam received by a radioisotope production apparatus according to an embodiment of the invention may, for example, have a diameter of 1 mm and a divergence of 1 mrad. Increasing the current in the electron beam will tend to cause the electrons to spread out due to space charge effects, and thus may increase the diameter of the electron beam. Increasing the current of the electron beam may therefore reduce the brightness of the electron beam. However, the radioisotope production apparatus does not require an electron beam with, for example, a diameter of 1 mm and may utilize an electron beam with a greater diameter. Thus, increasing the current of the electron beam may not reduce the brightness of the beam to such an extent that radioisotope production is significantly negatively affected. Indeed, providing the electron beam with a diameter greater than 1 mm may be advantageous because it spreads the thermal load delivered by the electron beam. It will be appreciated, however, that other injector types may also be used.

Although embodiments of the invention have been described in connection with generation of the radioisotope Mo-99, embodiments of the invention may be used to generate other radioisotopes. In general, embodiments of the invention may be used to generate any radioisotope which may be formed via direction of very hard X-rays onto a source material.

An advantage of the invention is that it provides production of radioisotopes without requiring the use of a high flux nuclear reactor. A further advantage is that it does not require the use of highly enriched uranium (a dangerous material which is subject to non-proliferation rules).

Providing the radioisotope production apparatus as part of a system which also comprises a free electron laser is advantageous because it utilizes apparatus already required by the free electron laser. That is, the radioisotope production uses apparatus which is, in part, already provided. Similarly, the radioisotope production apparatus may be located in an underground space (which may be referred to as a bunker) which includes shielding that contains radiation and prevents it from spreading to the environment. The underground space and at least some of the shielding may already be provided as part of the free electron laser, and thus the expense of providing an entirely separate underground space and associated shielding for the radioisotope production apparatus is avoided.

In an embodiment, a system may comprise a free electron laser and a radioisotope production apparatus which are capable of operating independently of each other. For example, the free electron laser may be capable of operating without the radioisotope production apparatus operating, and the radioisotope production apparatus may be capable of operating without the free electron laser operating. The free electron laser and radioisotope production apparatus may be provided in a common bunker.

Whilst embodiments of a radiation source SO have been described and depicted as comprising a free electron laser FEL, it should be appreciated that a radiation source may comprise any number of free electron lasers FEL. For example, a radiation source may comprise more than one free electron laser FEL. For example, two free electron lasers may be arranged to provide EUV radiation to a plurality of lithographic apparatus. This is to allow for some redundancy. This may allow one free electron laser to be used when the other free electron laser is being repaired or undergoing maintenance.

Although embodiments of the invention have been described as using Mo-100 to generate Mo-99 radioisotope which decays to Tc-99, other medically useful radioisotopes may be generated using embodiments of the invention. For example, embodiments of the invention may be used to generate Ge-68, which decays to Ga-68. Embodiments of the invention may be used to generate W-188, which decays to Re-188. Embodiments of the invention may be used to generate Ac-225, which decays to Bi-213, Sc-47, Cu-64, Pd-103, Rh-103m, In-111, I-123, Sm-153, Er-169 and Re-186.

It is to be understood that embodiments depicted in FIGS. 1 to 9 and 11a to 21 above may be combined in any suitable combination as will be apparent to the skilled person from the teaching above. For example, it is described with reference to FIGS. 1 and 3 that two electron targets may be provided either side of a photon target. It is to be understood that this arrangement may be combined with other described arrangements, such as those described with reference to FIGS. 1, and 5 to 8.

A lithographic system LS, such that that depicted in FIG. 10, may comprise any number of lithographic apparatus. The number of lithographic apparatus which form a lithographic system LS may, for example, depend on the amount of radiation which is output from a radiation source SO and on the amount of radiation which is lost in a beam delivery system BDS. The number of lithographic apparatus which form a lithographic system LS may additionally or alternatively depend on the layout of a lithographic system LS and/or the layout of a plurality of lithographic systems LS.

Embodiments of a lithographic system LS may also include one or more mask inspection apparatus MIA and/or one or more Aerial Inspection Measurement Systems (AIMS). In some embodiments, the lithographic system LS may comprise a plurality of mask inspection apparatuses to allow for some redundancy. This may allow one mask inspection apparatus to be used when another mask inspection apparatus is being repaired or undergoing maintenance. Thus, one mask inspection apparatus is always available for use. A mask inspection apparatus may use a lower power radiation beam than a lithographic apparatus. Further, it will be appreciated that radiation generated using a free electron laser FEL of the type described herein may be used for applications other than lithography or lithography related applications.

It will be further appreciated that a free electron laser comprising an undulator as described above may be used as a radiation source for a number of uses, including, but not limited to, lithography.

The term "relativistic electrons" should be interpreted to mean electrons which have relativistic energies. An electron may be considered to have a relativistic energy when its kinetic energy is comparable to or greater than its rest mass energy (511 keV in natural units). In practice a particle accelerator which forms part of a free electron laser may accelerate electrons to energies which are much greater than its rest mass energy. For example a particle accelerator may accelerate electrons to energies of >10 MeV, >100 MeV, >1 GeV or more.

Embodiments of the invention have been described in the context of a free electron laser FEL which outputs an EUV radiation beam. However a free electron laser FEL may be configured to output radiation having any wavelength. Some embodiments of the invention may therefore comprise a free electron which outputs a radiation beam which is not an EUV radiation beam.

The term "EUV radiation" may be considered to encompass electromagnetic radiation having a wavelength within the range of 4-20 nm, for example within the range of 13-14 nm. EUV radiation may have a wavelength of less than 10 nm, for example within the range of 4-10 nm such as 6.7 nm or 6.8 nm.

The lithographic apparatuses $LA_a$ to $LA_n$ may be used in the manufacture of ICs. Alternatively, the lithographic apparatuses $LA_a$ to $LA_n$ described herein may have other applications. Possible other applications include the manufacture of integrated optical systems, guidance and detection patterns for magnetic domain memories, flat-panel displays, liquid-crystal displays (LCDs), thin-film magnetic heads, etc.

Different embodiments may be combined with each other. Features of embodiments may be combined with features of other embodiments. Further, it will be appreciated that while embodiments described above refer to lithography and in particular lithography using free electron lasers, the invention is not limited to such embodiments and that radioisotopes may be generated in accordance with the embodiments of the invention in any free electron laser having a sufficient beam energy.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A radioisotope production apparatus comprising:
an electron source configured to provide an electron beam comprising electron pulses, the electron source comprising an electron injector and an electron accelerator;
a target support structure configured to hold a target; and
an electron beam splitter comprising a deflector configured to alternatingly deflect the electron pulses by:
applying a magnetic or electric field to deflect the electron beam;
splitting the electron beam to direct a first portion of the electron beam along a first path towards a first side of the target and to direct a second portion of the electron beam along a second path towards a second side of the target; and
directing substantially half of the electron pulses along the first path and half of the electron pulses along the second path,
wherein the radioisotope production apparatus is configured to produce radioisotope material based on irradiating the target using the first and second portions of the electron beam.

2. The radioisotope production apparatus of claim 1, wherein:
the target comprises an electron target and a photon target; and
the electron target is configured to receive at least one of the first and second portions of the electron beam and to emit photons towards the photon target.

3. The radioisotope production apparatus of claim 2, wherein the electron target comprises a first part configured to receive the first portion of the electron beam and a second part configured to receive the second portion of the electron beam.

4. The radioisotope production apparatus of claim 3, wherein the first and second parts of the electron target are disposed on either side of the photon target.

5. The radioisotope production apparatus of claim 1, further comprising a cooling apparatus configured to provide a fluid coolant to the target.

6. The radioisotope production apparatus of claim 5, wherein:
the target comprises an electron target and a photon target; and the cooling apparatus is configured to provide a liquid coolant to the electron target and to provide a gas coolant to the photon target.

7. The radioisotope production apparatus of claim 6, wherein the cooling apparatus is configured to provide the gas coolant at a higher pressure than the liquid coolant.

8. The radioisotope production apparatus of claim 1, wherein the electron beam splitter is further configured to perform switching between the first and second paths at a frequency that maintains a thermal load on the first and second sides of the target substantially evenly.

9. The radioisotope production apparatus of claim 1, wherein a portion of the electron pulses are bypassed to switch a propagation of the electron beam between the first and second paths.

\* \* \* \* \*